(12) United States Patent
Chalkley et al.

(10) Patent No.: US 11,897,649 B2
(45) Date of Patent: Feb. 13, 2024

(54) CUT AND SEAL METHOD AND APPARATUS

(71) Applicant: Altria Client Services LLC, Richmond, VA (US)

(72) Inventors: Jarrod W. Chalkley, Mechanicsville, VA (US); James D. Evans, Chesterfield, VA (US); Thien Hoang Nguyen, Glen Allen, VA (US); Patrick S. McElhinney, Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/174,016

(22) Filed: Feb. 24, 2023

(65) Prior Publication Data

US 2023/0202697 A1 Jun. 29, 2023

Related U.S. Application Data

(62) Division of application No. 17/550,261, filed on Dec. 14, 2021, now Pat. No. 11,591,128, which is a
(Continued)

(51) Int. Cl.
*B65B 65/08* (2006.01)
*B65B 61/06* (2006.01)
(Continued)

(52) U.S. Cl.
CPC .............. *B65B 61/06* (2013.01); *B29C 65/18* (2013.01); *B29C 65/305* (2013.01); *B29C 65/7451* (2013.01); *B29C 65/7894* (2013.01); *B29C 65/7897* (2013.01); *B29C 66/005* (2013.01); *B29C 66/1122* (2013.01); *B29C 66/133* (2013.01); *B29C 66/135* (2013.01); *B29C 66/4312* (2013.01); *B29C 66/4322* (2013.01); *B29C 66/83513* (2013.01); *B29C 66/849* (2013.01); *B65B 9/207* (2013.01); *B65B 9/2049* (2013.01); *B65B 51/306* (2013.01); *B65B 61/28* (2013.01); *B65B 65/08* (2013.01); *B29C 66/73921* (2013.01);
(Continued)

(58) Field of Classification Search
USPC .......................................................... 53/451
See application file for complete search history.

(56) References Cited

U.S. PATENT DOCUMENTS 2,024,258 A 12/1935 Tomlin et al.
2,374,194 A 4/1945 Grupe
(Continued)

FOREIGN PATENT DOCUMENTS

CN 114435692 A 5/2022

*Primary Examiner* — Chinyere J Rushing-Tucker
(74) *Attorney, Agent, or Firm* — Harness, Dickey & Pierce, P.L.C.

(57) ABSTRACT

A fin sealer and method to seal a radially outwardly directed fin of a tubular web structure by directing the fin through a nip between a first and a second fin sealing rollers while communicating heat to the fin through at least one of the fin sealing rollers is provided. The fin sealer is configured to maintain a nominal face-to-face relation between an outer annulus of the first fin sealing roller and an outer annulus of the second fin sealing roller with a flexible connection between a hub element of the second fin sealing roller with the outer annulus of the second fin sealing roller.

2 Claims, 16 Drawing Sheets

Related U.S. Application Data division of application No. 15/473,351, filed on Mar. 29, 2017, now Pat. No. 11,254,460.

(51) Int. Cl.

| | | |
|---|---|---|
| *B65B 61/28* | (2006.01) | |
| *B65B 9/207* | (2012.01) | |
| *B65B 9/20* | (2012.01) | |
| *B29C 65/00* | (2006.01) | |
| *B29C 65/18* | (2006.01) | |
| *B29C 65/74* | (2006.01) | |
| *B29C 65/78* | (2006.01) | |
| *B65B 51/30* | (2006.01) | |
| *B29C 65/30* | (2006.01) | |
| *B65B 57/14* | (2006.01) | |
| *B29L 31/00* | (2006.01) | |
| *B65B 29/00* | (2006.01) | |

(52) U.S. Cl.
CPC ....... *B29L 2031/7128* (2013.01); *B65B 29/00* (2013.01); *B65B 57/14* (2013.01)

(56) References Cited

U.S. PATENT DOCUMENTS

| | | | |
|---|---|---|---|
| 3,035,512 A | 5/1962 | Beachler | |
| 3,237,369 A | 3/1966 | Stroop | |
| 3,341,031 A | 9/1967 | Myers | |
| 3,641,737 A | 2/1972 | Tamagni | |
| 4,009,551 A | 3/1977 | Greenawalt et al. | |
| 4,018,028 A | 4/1977 | Donnet | |
| 4,036,408 A | 7/1977 | Dugge | |
| 4,199,919 A | 4/1980 | Moscatelli | |
| 4,207,136 A | 6/1980 | Schulze | |
| 4,512,757 A | 4/1985 | Dreckmann | |
| 4,630,429 A | 12/1986 | Christine | |
| 4,750,313 A | 6/1988 | Kammler et al. | |
| 4,881,360 A | 11/1989 | Konzal et al. | |
| 4,949,846 A | 8/1990 | Lakey | |
| 5,065,676 A | 11/1991 | Hardin | |
| 5,247,779 A * | 9/1993 | Wirsig | B65B 51/303 53/552 |
| 5,286,332 A | 2/1994 | Rossini | |
| 5,673,534 A | 10/1997 | Fowler | |
| 5,678,390 A | 10/1997 | Pruett et al. | |
| 5,826,403 A | 10/1998 | Haley | |
| 6,110,093 A | 8/2000 | Slusarz | |
| 6,161,366 A | 12/2000 | Bausch et al. | |
| 6,254,911 B1 | 7/2001 | Komatsu | |
| 6,332,305 B1 | 12/2001 | Takahashi | |
| 6,725,625 B1 | 4/2004 | Honma et al. | |
| 6,761,016 B1 | 7/2004 | Soleri | |
| 7,174,699 B1 | 2/2007 | Wyman et al. | |
| 7,175,738 B2 | 2/2007 | Lindsay et al. | |
| 9,126,704 B2 | 9/2015 | Williams | |
| 9,266,636 B2 | 2/2016 | Schneider et al. | |
| 2002/0166717 A1* | 11/2002 | Kubik | B29C 66/7294 181/142 |
| 2010/0101189 A1 | 4/2010 | Boldrini | |
| 2014/0048170 A1 | 2/2014 | Evans et al. | |
| 2015/0135654 A1 | 5/2015 | Taylor | |
| 2015/0232295 A1 | 8/2015 | Imazeki | |
| 2015/0336764 A1 | 11/2015 | Echerer | |
| 2015/0367975 A1 | 12/2015 | Schiavina | |
| 2017/0088298 A1 | 3/2017 | McLenithan et al. | |
| 2017/0129633 A1 | 5/2017 | Arai et al. | |
| 2017/0247130 A1 | 8/2017 | Hosaka et al. | |
| 2018/0334271 A1 | 11/2018 | Wolf et al. | |

\* cited by examiner

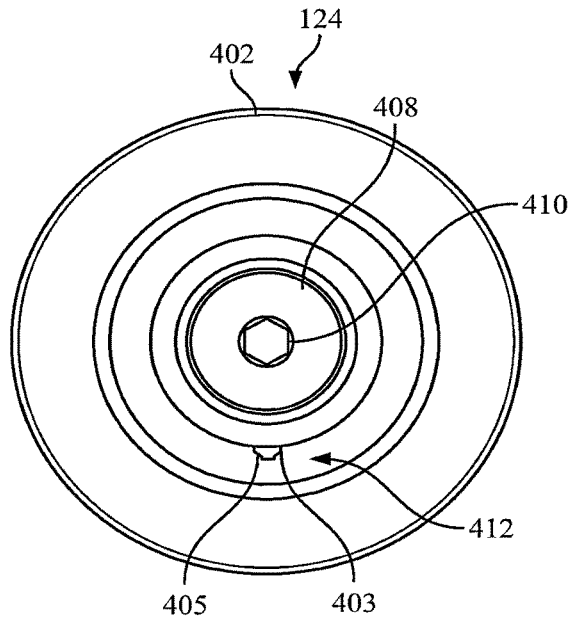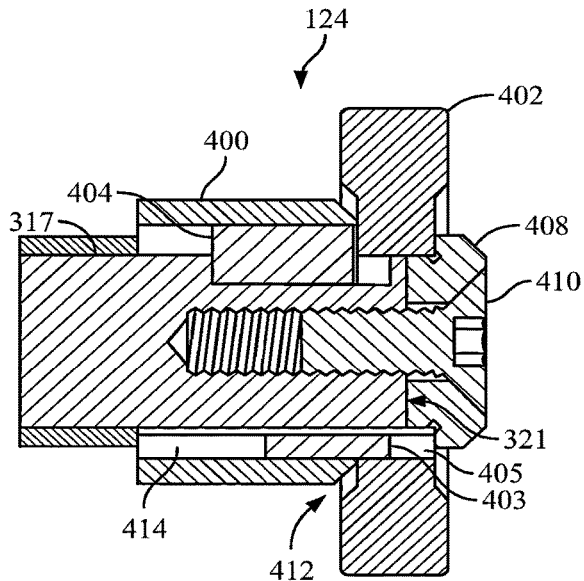
FIG. 18A    FIG. 18B
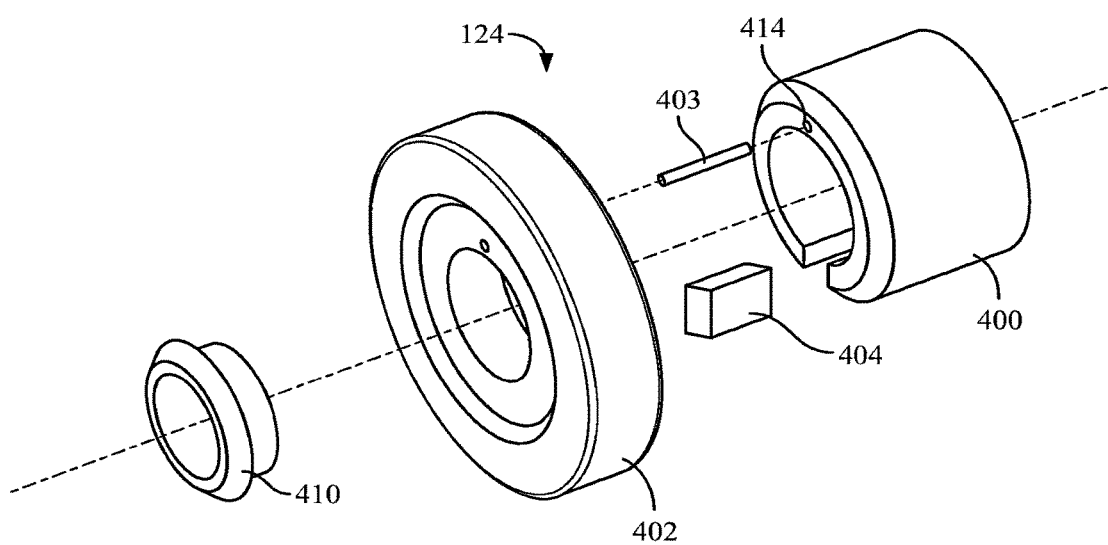
FIG. 18C

CUT AND SEAL METHOD AND APPARATUS

CROSS-REFERENCE TO RELATED APPLICATIONS

This application is a divisional of U.S. application Ser. No. 17/550,261, filed on Dec. 14, 2021, which is a divisional of U.S. application Ser. No. 15/473,351, filed on Mar. 29, 2017, the entire contents of each of which are incorporated herein by reference.

FIELD

This disclosure relates generally to systems and methods of manufacturing packets of flowable material and, more particularly, to systems and methods of manufacturing packets (pouches) of smokeless tobacco for placement into containers in a continuous operation at great speed and reliability.

ENVIRONMENT

Various forms of smokeless tobacco, including pouched moist smokeless tobacco (MST) are provided to the consumer in a lidded cylindrical container (can) that is constructed from metal, paperboard and/or plastic. Pouched MST or STILES may comprise a measured portion of smokeless tobacco enclosed in a paper web that has been folded into a pillow-like form and sealed such that it has a transverse, sealed seam at each end of the pillow-like form and a longitudinal seam extending therebetween.

With the ever-increasing consumption of smokeless tobacco and the advantages of having individual portions prepackaged in a suitable permeable pouch (packet), a need has arisen for large scale, high speed, reliable production and packaging of these rather small pouches (approximately 1.5 inch by ⅞ inch). A persistent challenge has been to reliably form individual packages in a continuous manner at elevated rates of production which can meet demanding quality control and product specifications.

More particularly, heretofore, techniques for automated production of MST or snus packets have included forming the transverse seam of the packet by a separate sealing operation followed by a separate cutting operation. Such arrangement necessitates synchronization of the two operations and complicates "size changes" at the machine when it is desired to produce a pouch of a different size on a machine that has been already configured to produce pouches of a first size. Furthermore, the separate sealing operation generates a string of sealed, uncut packets which requires an additional material handling operation between the machine location of the sealing operation and the machine location of the cutting operation. Misalignment of the string at the cutter due to a failure, limitation or lapse of the material handling operation may produce skewed cuts at the transverse seam of the pouches, resulting in product that is inconsistent, possibly out of specification and/or visually less acceptable to the consumer. In such systems, the risk of misalignment increases with machine speed and may arise during startup and shutdown of the system.

Separation of the sealing and cutting operations has been used to avoid complications arising from attempting to sever along a web seam that is still in a heated condition. At the instance of sealing, the web may retain a degree of tackiness that causes the web (and the pouch) to stick to elements of the sealing station. With separate sealing and cutting operations, the string of sealed but yet to be cut pouches emanating from the sealing station pulls the most recently formed uncut pouch away from components of sealing station to overcome any sticking, but such action may cause the string to oscillate or displace when sticking occurs. Accordingly, stickiness at the sealing operation can be a source of misalignment of the string of pouches at the cutter and create the aforementioned problems associated with material handling between separate sealing and cutting stations. This risk of misalignment increases with machine speed and may arise during machine startup and shutdown.

Accordingly, there has been an unmet need for a method and apparatus to produce snus pouches at high speed, but without resort to separate sealing and cutting operations of the pouches so as to promote consistency in product quality and appearance.

Furthermore, it would be desirous to provide a method and apparatus to produce snus pouches in a manner which facilitates sealing and cutting at transverse seam of the pouch in a single operation.

Additionally, it would be desirous to provide a method and apparatus to produce snus pouches at high speed, in a manner which facilitates sealing and cutting at transverse seam of the pouch in a single operation which overcomes the risks of impacting product quality and appearance from tackiness at the seam.

SUMMARY

An aspect of the present disclosure provides a method of forming a stream of individual packets comprising: rotating a knife, an anvil and sealing jaws into opposing relation at a nip, continuously forming a tubular web structure and drawing the continuously formed tubular web structure to the nip, repetitively sealing the continuously formed tubular web structure transversely at the nip by rotating sealing jaws into opposing relation at the nip so as to seal a transverse portion of the tubular web structure, severing the continuously formed tubular web structure at a location along the transverse sealed portion by rotating the anvil and the knife into an opposing relation at the nip against the transversely sealed portion so as to form a severed, completed packet beyond the nip, whereby a stream of completed packets is established, and further rotating the anvil, the knife and the sealing jaws into a proximal relation to a stripper element, whereby, should a completed packet stick to any of the anvil, the knife and/or the sealing jaws, the stripper element releases the stuck completed packet from the anvil, the knife and/or the sealing jaw.

In an embodiment, the repetitively sealing and severing may also form a partially closed packet structure adjacent the nip and the continuously formation of a tubular web structure may include forming the tubular web structure about a feed tube. The method may further comprise feeding through the feed tube a charge of flowable material into the partially closed packet structure concertedly with the repetitively sealing and severing.

Rotation of the sealing jaws, the anvil and the knife may be maintained at a constant speed, including constant speed of rotation through the nip. Their rotation may comprise rotation of first and second rotors while supporting the knife and a first set of the sealing jaws on the first rotor and supporting the anvil and a second set of the sealing jaws on the second rotor, while also spring loading the knife, the anvil and at least one of the first and second sets of the sealing jaws.

The knife, the anvil and the first and second sets of the sealing jaws may be constructed from a hardened metal, whereby the hardened metal, the constant speed of rotor rotation and the spring loading of the knife, the anvil and at least one of the first and second sets of the sealing jaws facilitate a higher speed of the sealing and severing at the nip than an operation lacking the hardened metal, the constant speed of rotor rotation and the spring loading.

The severing may include severing with a scissoring action wherein the severing initiates on a side of the sealed portion of the tubular web structure and progresses across the sealed portion to an opposite side as the knife is rotated through the nip. The scissoring action may include rotating a blade of the knife about an axis while maintaining the knife blade at an angle with respect to the axis. In an embodiment, the angle is in the range of approximately 2 to approximately 6 degrees.

In an embodiment, the method may further comprise catching the severed, completed packets beyond the nip with a packet catcher having a lip, wherein the lip operates as the stripper. The method may further include entraining completed packets by discharging a stream of gas downwardly into the catcher, whereby the catcher is cleared of completed packets through an open end of the catcher below the nip.

In an embodiment, the method may further comprise directing the stream of completed packets through a pivotable sampling funnel and controllably pivoting the sampling funnel to and from a first position and a second position. When at the first position, the sampling funnel directs the stream of completed packets in a first direction toward a packet receiving location for a container and when at the second position, the sampling funnel diverts the stream of completed packets in a second direction away from the packet receiving location for a container.

The method may further comprise directing the stream of completed packets through a gated transfer funnel comprising a gate, including holding back the stream of completed packets within the gated transfer funnel by closing the gate when a container is absent from the packet receiving location and including opening the gate when a container is positioned at the packet receiving location. Additionally, the method may further comprise counting the number of completed packets passing by a location along a path to the packet receiving location and controllably operating at least one of the sampling funnel and the gate of the gated transfer funnel to control delivery of completed packets to a container at the packet receiving location in accordance with a predetermined number of packets.

The method may further comprise delivering completed packets to a container in accordance with a predetermined number of packets at the packet receiving location and thereafter controllably moving the container from the packet receiving location to a second location and tamping the delivered completed packets at the second location. The method may further comprise executing a weight check upon the container beyond the second location, and adjusting the feeding of the flowable material responsively to the weight check so as to maintain consistency of the feeding.

In an embodiment, the delivery includes simultaneous delivery to a set of containers with multiple streams of individual packets at a plurality of the packet receiving locations and thereafter controllably moving the set of containers from the plurality of packet receiving locations to a plurality of the second locations and simultaneously tamping the delivered completed packets of the set of containers at the plurality of second locations.

The disclosed method may also include establishing a temperature difference (differential) at the nip by cooling at least one of the rotors.

In an embodiment, the continuous formation of a tubular web structure may include forming the tubular web structure with a radially outwardly directed fin by mutually superimposing longitudinal edge portions of the tubular web structure and sealing the radially outwardly directed fin by directing the fin through a nip between first and second fin sealing rollers while communicating heat to the fin through at least one of the fin sealing rollers. The method may further comprise maintaining a nominal face-to-face relation between outer annulus of the first fin sealing roller and an outer annulus of the second fin sealing roller by flexibly connecting a hub of the second fin sealing roller with the outer annulus of the second fin sealing roller, whereby consistent sealing of the fin is enhanced.

Another aspect of the present disclosure provides an apparatus for forming a stream of individual packets, comprising a folder arranged to form a tubular web structure from a continuous ribbon of web, a feeder arranged to feed the formed tubular web structure along a path to a nip; and a first rotor comprising a first sealing jaw and a knife adjacent the first sealing jaw, a second rotor comprising a second sealing jaw and an anvil adjacent the second sealing jaw. The first and second rotors are mutually arranged so that upon rotation of the first and second rotors they rotate into opposing relation at the nip so as to seal a transverse portion of the tubular web structure and the knife and the anvil rotate into an opposing relation at the nip to sever the transversely sealed portion so as to form a severed, completed packet beyond the nip. The apparatus includes an open ended packet catcher adjacent the first and second rotors which is arranged to catch the severed, completed packets beyond the nip whereby a stream of packets is established. The packet catcher includes a stripper disposed in a proximal location to at least one of the anvil, the knife and the sealing jaws when the anvil, the knife and/or the sealing jaws are rotated beyond the nip, whereby, should a completed packet stick to any of the anvil, the knife and/or the sealing jaws, the stripper is operative to free the stuck packet from the anvil, the knife and/or the sealing jaw.

In an embodiment, the apparatus may further comprise an arrangement to control rotation of the first and second rotors such that the sealing jaws, the anvil and the knife at a constant speed. Additionally, least one of the knife and the anvil may be spring loaded and at least one of the first and second sealing jaws may be spring loaded. The knife, the anvil and the first and second sealing jaws may be constructed from a hardened metal, whereby the hardened metal, the constant speed of rotor rotation and the spring loading facilitate a higher speed of the sealing and severing at the nip than an operation lacking the hardened metal, the constant speed of rotor rotation and the spring loading.

The packet catcher may further comprise an arrangement to discharge a stream of gas downwardly into the packet catcher, whereby the packet catcher is cleared of completed packets through an open end of the catcher below the nip. The packet catcher may include a side wall having an arcuate upper wall portion configured to prevent a completed packet from escaping sideways.

In an embodiment, the apparatus may further comprise a pivotable sampling funnel that is controllably pivotal and operative as previously described above in regard to the corresponding disclosed methods. The apparatus may further comprise a gated transfer funnel that may include a hold-back gate and a counter, which cooperate as previously described above with regard to the corresponding disclosed methods.

In an embodiment, the apparatus may further comprise delivering completed packets to a container at the packet receiving location in accordance with a predetermined number of packets and thereafter controllably moving the container from the packet receiving location to a second location and tamping the delivered completed packets at the second container location. The apparatus may further comprise a weight check operative upon the container at a third location beyond the second location, and an arrangement to adjust the feeding of the flowable material responsively to output of the weight check so as to maintain consistency of the feeding.

In another embodiment, the folder may be configured to superimpose longitudinal edge portions of the web to form a radially outwardly directed fin and the apparatus may further comprise a fin sealer arranged to seal the radially outwardly directed fin by directing the fin through a nip between first and second fin sealing rollers while communicating heat to the fin through at least one of the fin sealing rollers. The fin sealer may be arranged to maintain a nominal face-to-face relation between an outer annulus of the first fin sealing roller and an outer annulus of the second fin sealing roller with a flexible connection between the outer annulus of the second fin sealing roller and a hub component of the second fin sealing roller, whereby consistent sealing of the fin is enhanced.

In a further embodiment, the flexible connection may comprise a floating roller and a flexible drive pin connection between the floating roller and the hub component. In another further embodiment, the flexible connection may comprise a resilient disc operative between the central component and the outer annulus of the second fin sealing roller. In yet another further embodiment, the flexible connection comprises a body of elastic material operatively disposed between the hub component and the outer annulus of the second fin sealing roller.

Another aspect of the present disclosure provides a fin sealer and method to seal a radially outwardly directed fin of a tubular web structure by directing the fin through a nip between a first and a second fin sealing rollers while communicating heat to the fin through at least one of the fin sealing rollers, the fin sealer being further arranged to maintain a nominal face-to-face relation between an outer annulus of the first fin sealing roller and an outer annulus of the second fin sealing roller with a flexible connection between a hub of the second fin sealing roller with the outer annulus of the second fin sealing roller, whereby consistent sealing of the fin is enhanced. Further embodiments of the fin sealer are provided which correspond with those described immediately above.

Yet another aspect of the present disclosure provides a method of sealing a web body comprising supporting a first thermally conductive sealing jaw on a first rotor, supporting a second thermally conductive sealing jaw on a second rotor, rotating the first and second rotors to bring the first second sealing jaws into an opposing relation in contact with the web body, and while rotating the first and second rotors heating at least the first sealing jaw of the first rotor and cooling the second rotor whereby transfer of heat from the first sealing jaw to the second sealing jaw is promoted.

Further to that aspect, the aforementioned apparatus may include a cooling system arranged to cool at least one of the first and second rotors of the apparatus, and in an embodiment, the cooling system may comprise a coaxial channel provided in one of the first and second rotors and an open ended conduit coaxially disposed within the channel. The open ended conduit may be communicated with a source of coolant such that an incoming flow of coolant and a reversed flow of coolant may be established within the rotor.

BRIEF DESCRIPTION OF THE DRAWINGS

The forms disclosed herein are illustrated by way of example, and not by way of limitation, in the figures of the accompanying drawings and in which like reference numerals refer to similar elements and in which:

FIG. 18A is a planar front view of a roller assembly constructed in accordance with an embodiment of the disclosure;

FIG. 18B is a cross sectional side view of a roller assembly of FIG. 18A;

FIG. 18C is an exploded perspective view of a roller assembly of FIG. 18A;

DETAILED DESCRIPTION

Figure 1:
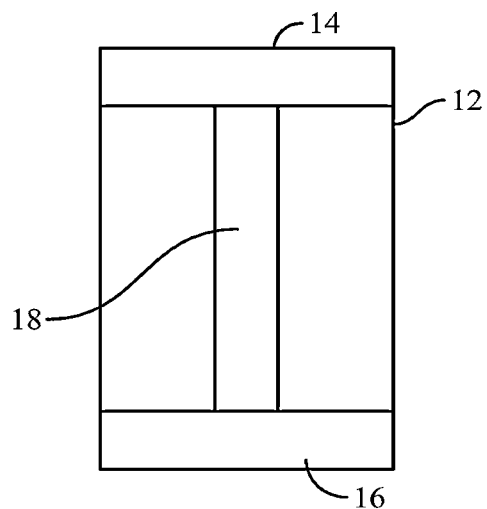
FIG. 1 is a planar side view of an exemplary tobacco pouch (packet) suited for manufacture in accordance with methods and apparatus disclosed herein.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Specific forms will now be described further by way of example. While the following examples demonstrate certain forms of the subject matter disclosed herein, they are not to be interpreted as limiting the scope thereof, but rather as contributing to a complete description.

Throughout the teachings herein, separate references are made to a controller C for controlling various elements of the disclosed embodiments. It is to be understood that each of those controllers may be a single common controller C or several separate controllers C, which may be, but not necessarily, under a common control of a master controller C.

Figure 2:
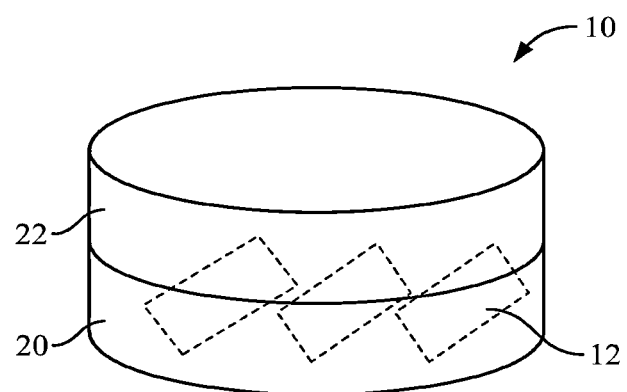
FIG. 2 is a perspective view of a container which has been loaded with a number of tobacco pouches shown in FIG. 1.

Referring to FIGS. 1 and 2, this disclosure relates generally to systems and methods of filling containers 10 with units of smokeless tobacco such as packets (pouches) 12 of moist smokeless tobacco (MST). By way of non-limiting example, the packet 12 may have a pillow-like shape and include an upper transverse seam 14, a lower transverse seam 16 and longitudinal seam 18 extending therebetween. The longitudinal seam 18 may be a lapped seam wherein longitudinal edges are overlapped and sealed together or a fin seam wherein longitudinal edges portions are drawn together in an opposing relation so as to form an outward extending fin, which is then sealed and folded against an adjacent region of the pouch body. Regardless of which type of longitudinal seam is utilized, each pouch preferably contains a predetermined (metered, measured) portion of shredded tobacco in the form of moist smokeless tobacco (MST), but it is contemplated that the teachings herein would have applications in the manufacture and packaging of pouches having contents, sizes and layouts other than what is specifically disclosed herein.

Referring particularly to FIG. 2, in an embodiment, the container 10 may be in the form of puck-shaped can comprising a container bottom (cup) 20 and a removable lid 22; however, the teachings herein are also applicable to various containers of different sizes, shapes and configurations.

The present disclosure teaches a novel method and apparatus to repetitively produce a stream of individual pouches of smokeless tobacco and to repetitively load predetermined number of packets into containers in a continuous operation with on-line weight control and other quality control features. According to aspects disclosed herein, a system includes a plurality of pouch making machines (lanes) that may operate continuously and in parallel.

A conveyor system may be structured and arranged to simultaneously move a plurality of empty containers into alignment with the plurality of pouch making machines, such that the respective containers of a set are simultaneously filled with pouches directly from respective ones of the pouch making machines (lanes L). The position of each container may be tracked throughout the entire system by a controller, and each container may be associated with the particular one of the pouch making machines from which it was filled. Each container may be weighed after being filled, and at least one operational parameter of the pouch making machine associated with the weighed container may be adjusted based on the weight of the container independently of the operation of the other pouch making machines.

Figure 3:
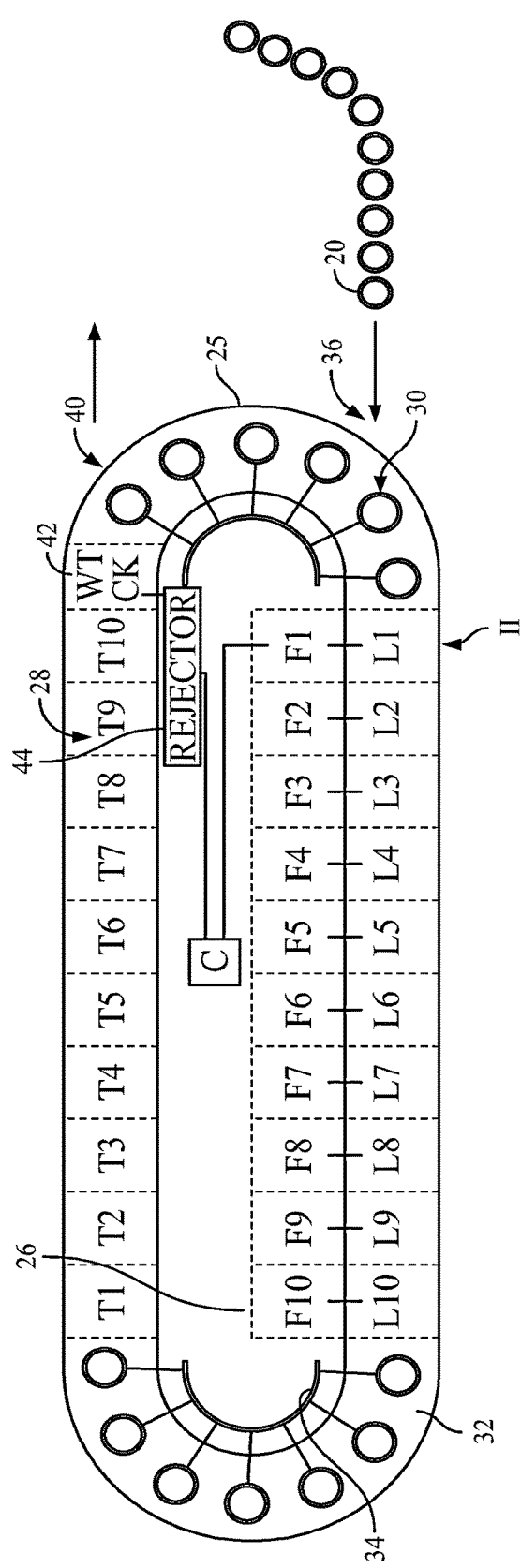
FIG. 3 is top planar representation of an exemplary direct-to-can system arranged to produce tobacco pouches to load them into container bottoms in accordance with an embodiment herein.

According to aspects described herein and in reference to FIG. 3, the pouch producing and loading system 25 may comprise a plurality of pouch production lanes L1, L2, . . . , LN, which are each configured to produce a stream of individual pouches 12 and place (load) a predetermined number of pouches 12 into an individual container bottom 20. In embodiments, the pouch producing and loading system 25 may further comprise a tobacco feed system 26 comprising a plurality of tobacco feeders F1, F2, . . . , FN for repetitively feeding metered amounts of flowable material such as MST (tobacco) into the pouch production machine lanes L1, L2, . . . , LN, and a tamping system 28 comprising a plurality tamping stations T1, T2, . . . , TN for tamping the pouches 12 that have been placed in the container bottoms 20 to avoid spill of product and to facilitate further handling and operations, including placement of the lid 22 upon the loaded and tamped container bottom 20. In embodiments, the feeders F may each comprise a twin screw feeder hose output is adjusted by controlling the amount of rotation of the screws for each feed cycle. In other embodiments, the feeders F may comprise a volumetric slide that moves one or more metering cavities to and fro a first position where the cavity fills and a second position where the filled cavity is communicated with a pulsed jet of air, such as the feed system described in U.S. Provisional Patent Application Ser. No. 62/199,110, which patent document is incorporated herein by reference in its entirety for all purposes that may be served herein. Further details and aspects of a "direct-to-can" system (as described above in reference to FIGS. 1 and 2 herein) may be found in US Patent Publications Nos. 2014/0048170 and 2014/0047804, which patent documents are incorporated herein by reference in its entirety for all purposes to be served herein.

In embodiments, the pouch producing and loading system 25 may further comprise a conveyor system 30 comprising a track 32 extending through locations of the production and loading lanes L1-LN and the tamping stations T1-T10 and a carousel 34 arranged to pick-up individual container bottoms 20 from a feed station 36 and to repetitively move sets of the picked-up container bottoms 20 into position with the pouch production lanes L and then the tamping stations, T, wherein the sets correspond in number to that of the plurality of lanes L (and the plurality of tamping stations T).

Figure 4:
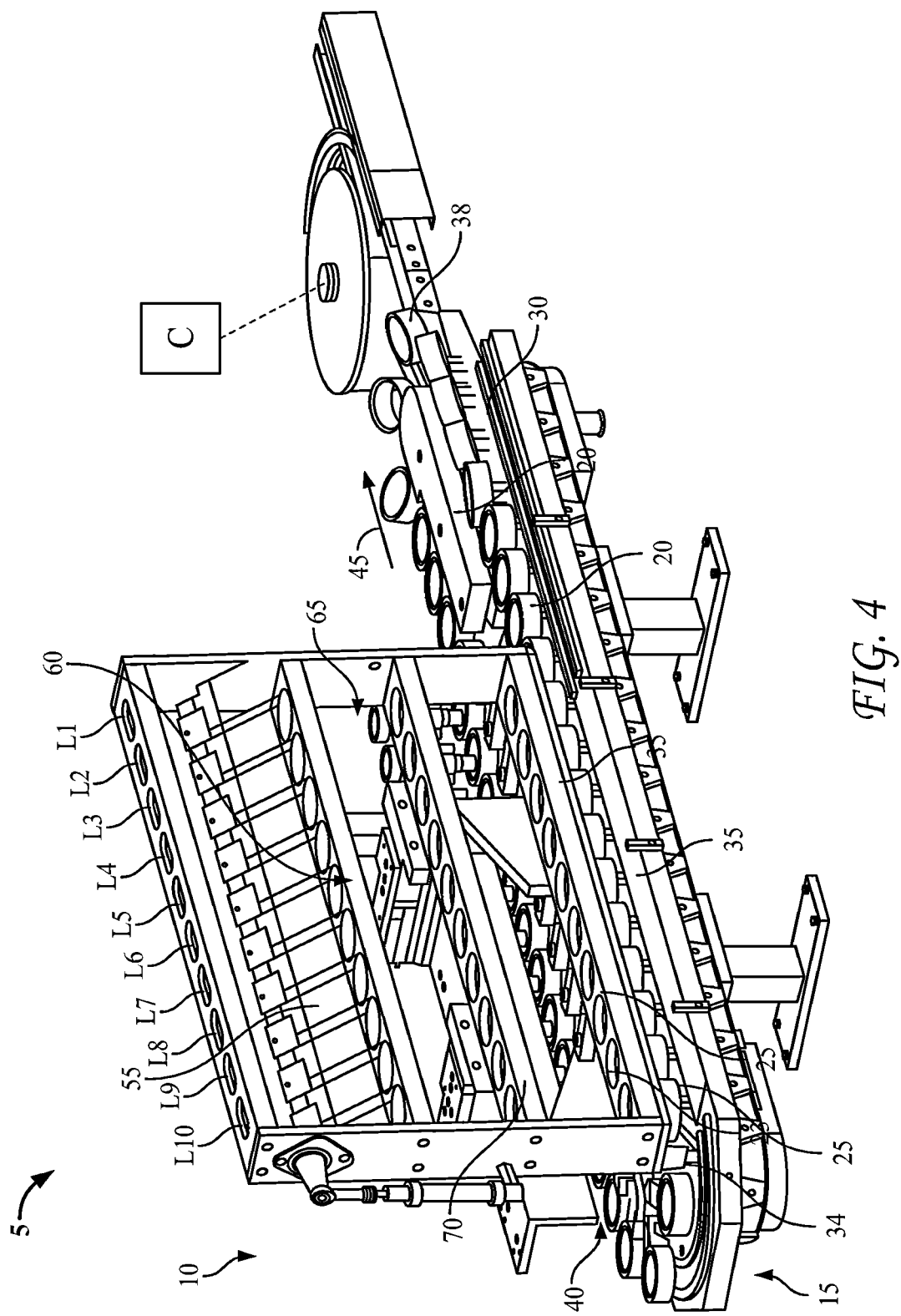
FIG. 4 is a perspective view of the exemplary system represented in FIG. 3.

Referring now also to FIG. 4, in embodiments, the carousel 34 may comprise a plurality of spaced apart funnel cups 38 pivotally supported from an endless conveyor and suitable motors and/or actuators controlled by a controller "C". In implementations, the conveyor system 25 is structured and arranged such that each funnel cup 38 engages an upper rim of an empty container bottom 20 at the feed station 36 and moves the empty container bottom 22 into position with one of the lanes L for execution of a loading operation, whereupon the carousel moves the funnel cup 38 and the engaged container bottom 20 to a corresponding tamping station T for execution of a tamping operation. Thereafter the carousel moves the funnel cup 38 and the engaged container bottom 20 to an exit station 40 where the funnel cup 38 is raised to release the container bottom 20. Upon its release, the loaded and tamped container bottom 20 is directed to further packaging operations such as a lidder, labeler and boxer.

In embodiments, in lieu of or in addition, the carousel may comprise a plurality of carrier forks 39 (FIG. 6), which engage sidewalls of individual container bottoms 20 to move the container bottoms 20 in like manner as the funnel cups 38.

In embodiments, a weight check station 42 may be arranged along the track 32 between the tamping stations (T1-T10) and the exit station 40 and may be configured to weigh each loaded and tamped container bottom 20 for purposes of providing the controller C with a signal indicative container weight. The controller C may be configured to operate a rejector 44 should the indicated weight of the loaded and tamped container 20 be below a threshold weight that is indicative of the container 20 missing one or more pouches. Because all of the pouches 12 in a given container bottom 20 are produced from the same lane L and corresponding feeder F, the controller C may also be configured to adjust feed rate at a corresponding feeder F responsively to signals from weight check station 42 that are indicative of a trend in the measured weight values for the given, corresponding feeder F away from a nominal (specified) weight.

Figure 5:
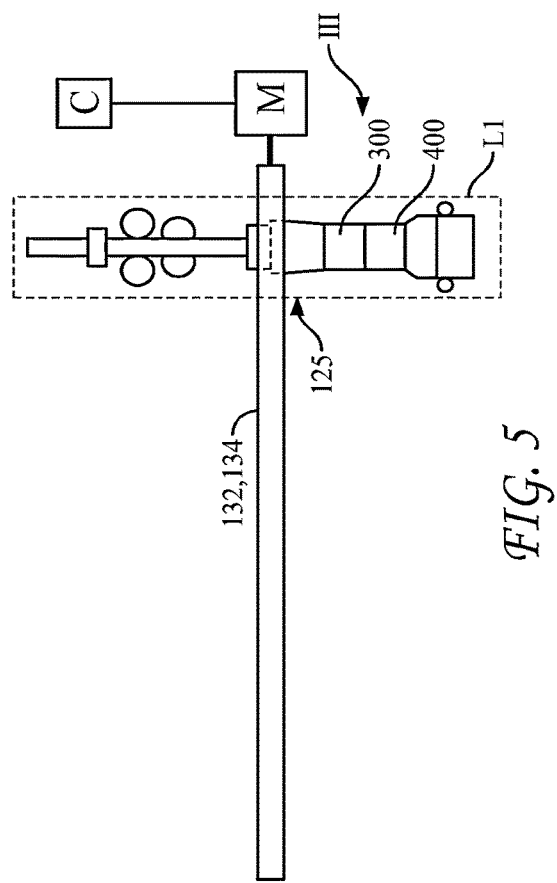
FIG. 5 is a frontal representation of a single machine lane L1 of the exemplary system represented in FIG. 3.
Figure 6:
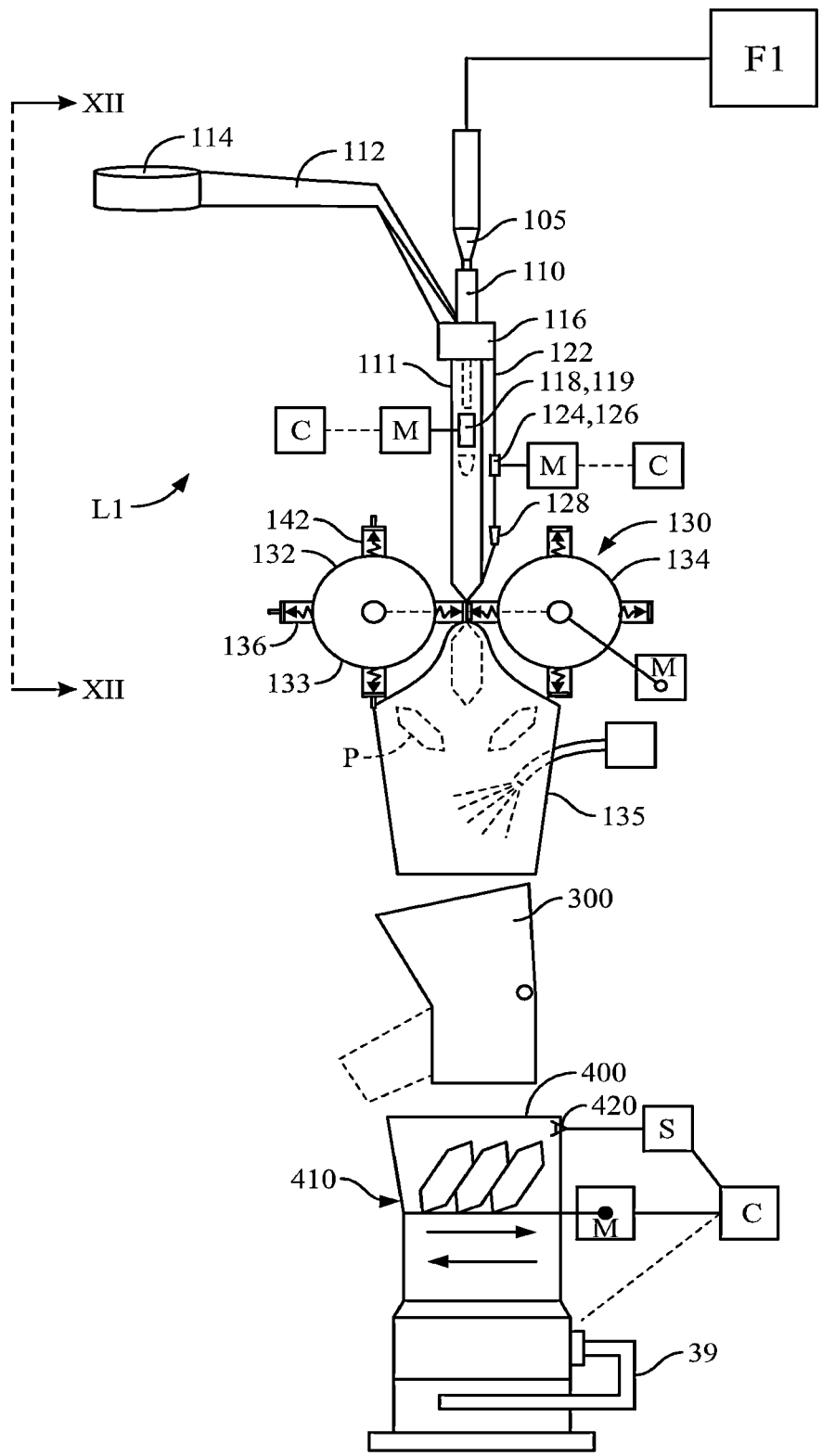
FIG. 6 is a side view of the single machine lane L1 represented in FIG. 5.

Referring now to FIGS. 5 and 6, in various embodiments each lane such as by way of example may comprise an (inlet) funnel 105 of a feed tube 110 which receives the output of the tobacco feeder F1 of the lane L1. In embodiments, a continuous ribbon of web 112 may be fed from a source of web such as a bobbin 114 to a folding collar 116 at location along the feed tube 110. The folding collar 116 is configured to fold the continuous web 112 into a tubular web form 111 about the exterior of the feed tube 110. A pair of drive (drawing) rollers 118, 119 may be used to draw the tubular web form 111 downwardly along the feed tube 110 toward a cut and seal station 130 comprising a knife-bearing rotor 132 and an anvil-bearing rotor 134 and a pouch catcher/stripper chute 135. A suitable motor M may controllably drive the drive rollers 118, 119, which may be controlled via signals from a controller C.

In embodiments, the folding collar 116 is configured to form a fin seam 122 by outwardly folding longitudinal edge portions of the continuous ribbon of web 112, which are then sealed into a mutually opposing relation as the fin 122 is drawn through opposing, sealing rollers 124, 126 (at least one of which is heated). Thereupon the fin 122 may be folded over against adjacent regions of the tubular web form 111 by a plow 128 or other suitable folding device. In other embodiments, the folding collar 116 may be configured to fold the continuous web 112 into a tubular body having a lapped seam, wherein a heated roller presses the lapped seam against an opposing portion of the feed tube 110 to thermo-mechanically seal the lapped seam.

Figure 7:
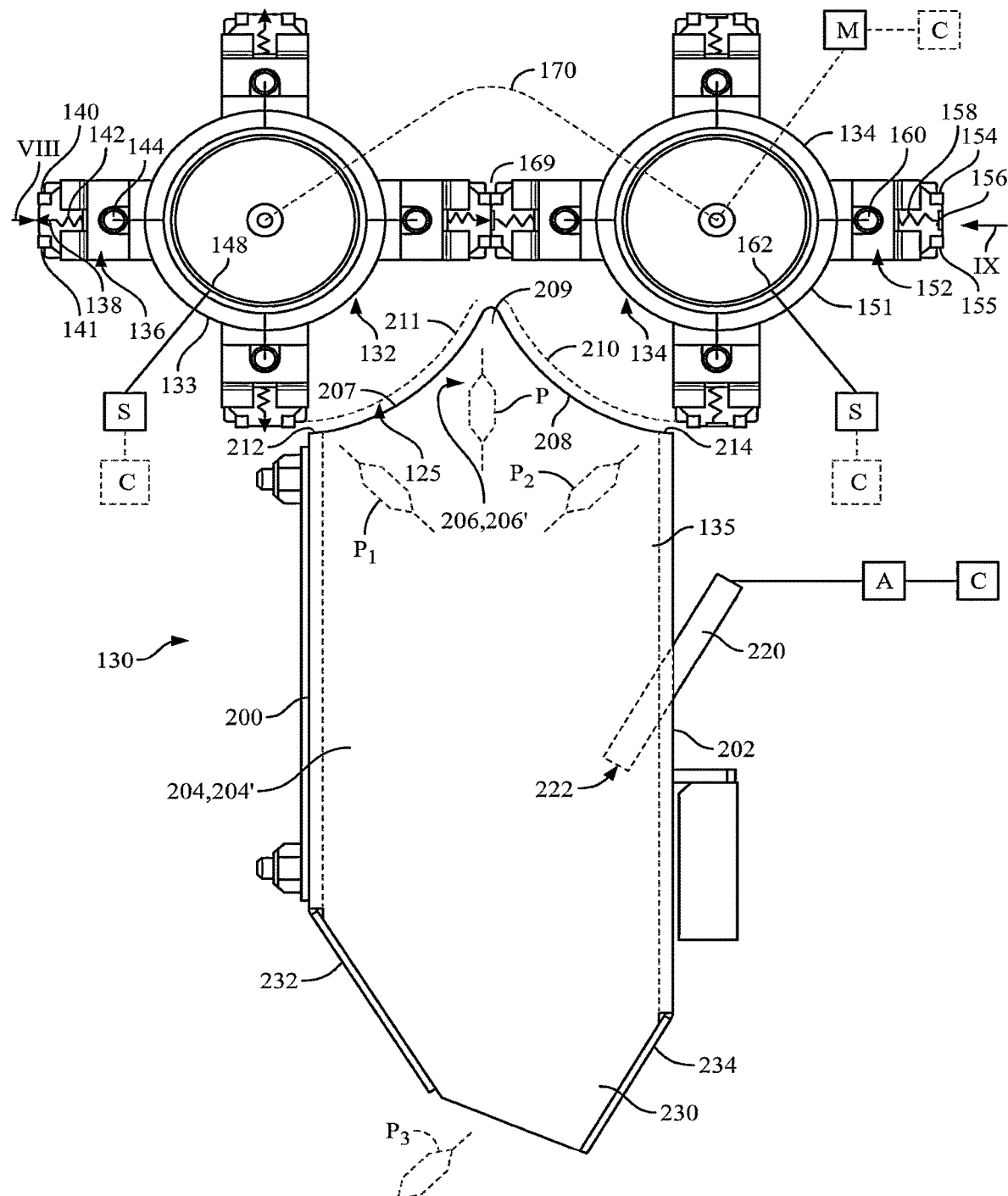
FIG. 7 is a detail side view of the cut and seal component of the single lane L1 shown in FIG. 6.
Figure 8:
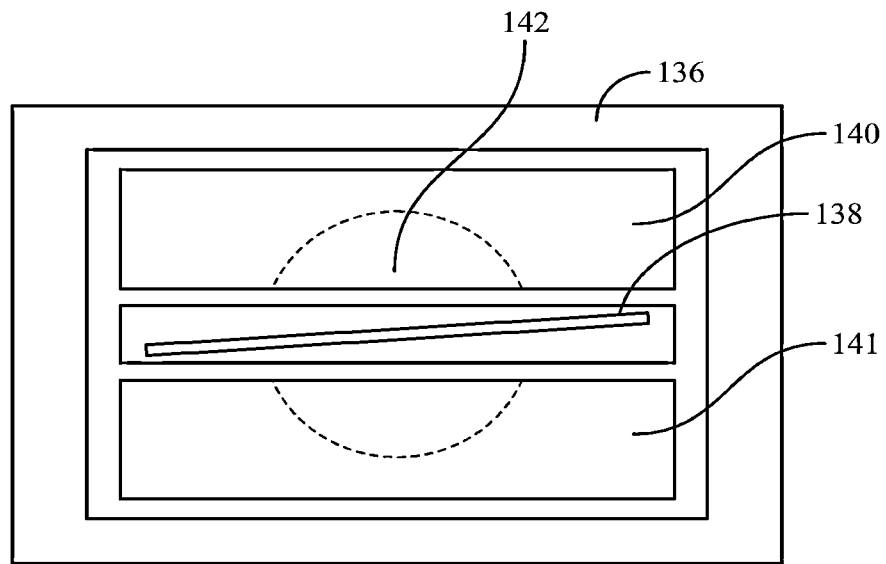
FIG. 8 is a detail planar view of the knife fixture as viewed in the direction of arrow VIII in FIG. 7.

In embodiments, at the location of the respective lane (L1), the knife-bearing rotor assembly 132 of the cut and seal station 130 may comprise a first rotor body 133 to which is affixed a plurality of knife fixtures 136 at spaced locations about the periphery of the first rotor body 133. In embodiments, each knife fixture 136 provides support for a pair of mutually parallel, metallic sealing plates (jaws) 140, 141 and a knife 138 disposed therebetween. Referring now also to FIGS. 7 and 8, the metallic sealing jaws 140, 141 may extend axially (parallel to the axis of rotation of the first rotor body 133), and the knife 138 may extend generally coextensively with the metallic sealing jaws 140, 141 but may be set at a small angle (approximately 2 to 6 degrees) off parallel. In embodiments, each knife 138 may be spring-loaded in a radially outward direction by a spring 142. For the production of tobacco loaded pouches, the edge of the knife 138 may extend approximately 0.2 mm beyond the plane of the metallic sealing jaws 140, 141. The metallic sealing jaws 140, 141 may be constructed of a hardened steel, they may include a coating and/or a highly polished work/contact surface to minimize sticking with web material, and they may be rigidly affixed to the fixture 136 or in other embodiments, spring-loaded. In an embodiment, the sealing jaws 140, 141 may be outer surface portions of a single fixture piece, and the knife may be operatively disposed in an opening that may be provided in the fixture piece between the sealing jaws 140, 141. Each fixture 136 may be provided with an electrically resistive heating element 144 which may extend axially through the fixture 136 and may be communicated via a suitable (rotary) electrical connection 148 to a source S of electrical power under the control of a controller C. The heat generated by the electrically resistive heating element 144 is communicated to the metallic sealing jaws 140, 141 through portions of the fixture 136 at a rate sufficient for maintaining the metallic sealing jaws 140, 141 at an operating temperature at which they have the capacity to thermally seal the material of the web 112 without scorching.

Figure 9:
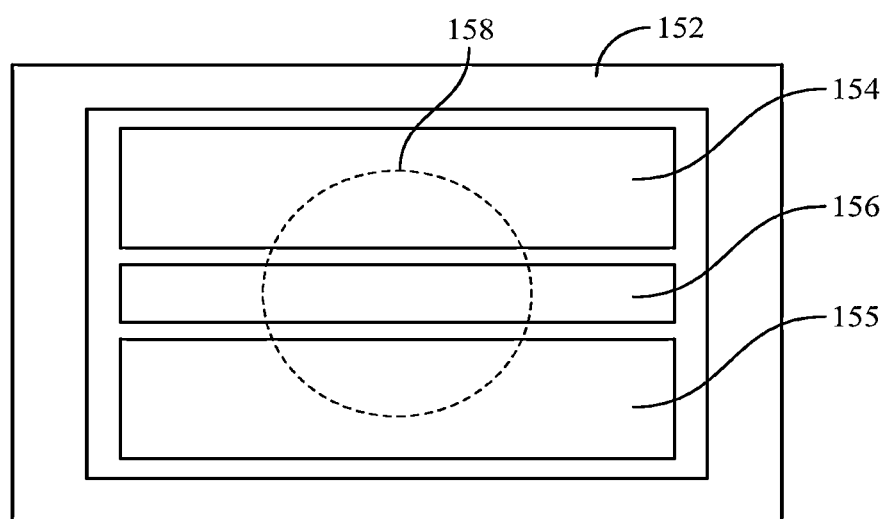
FIG. 9 is a detail planar view of the anvil fixture shown as viewed in the direction of arrow IX in FIG. 7.

Referring now to FIGS. 7 and 9, in embodiments, the anvil-bearing rotor assembly 134 of the cut and seal station 130 may comprise a second rotor body 151 to which is affixed a plurality of anvil fixtures 152 at spaced locations about the periphery of the second rotor body 151. In embodiments, each anvil fixture 152 provides support for a pair of mutually parallel, metallic sealing plates (jaws) 154, 155 and a rigid, metallic, anvil body plate (anvil) 156 disposed therebetween. The metallic sealing jaws 154, 155 may extend axially (parallel to the axis of rotation of the second rotor body 151), and the rigid, metallic, anvil 156 may extend generally coextensively with and parallel to the metallic sealing jaws 154, 155. In embodiments, each rigid, metallic, anvil 156 may be spring-loaded in a radially outward direction by a spring 158. The metallic sealing plates jaws 154, 155 may be constructed of a hardened steel, they may include a coating and/or a highly polished work/contact surface to minimize sticking with web material, and they may be rigidly affixed to the fixture 136 or in other embodiments, spring-loaded. In an embodiment, the anvil 156 may be mounted in a fixed relation with the sealing jaws 154, 155, with both the anvil 156 and the sealing jaws 154, 155 being spring-loaded by the spring 158. Each fixture 152 may be provided with an electrically resistive heating element 160 which may extend axially through the fixture 152 and may be communicated via a suitable (rotary) electrical connection 162 to a source S of electrical power under the control of a controller C. The heat generated by the electrically resistive heating element 144 is communicated to the metallic sealing plates (jaws) 154, 155 through portions of the fixture 152 at a rate sufficient for maintaining the metallic sealing jaws 154, 155 at an operating temperature at which they have the capacity to thermally seal the material of the web 112 without scorching.

Figure 10A:
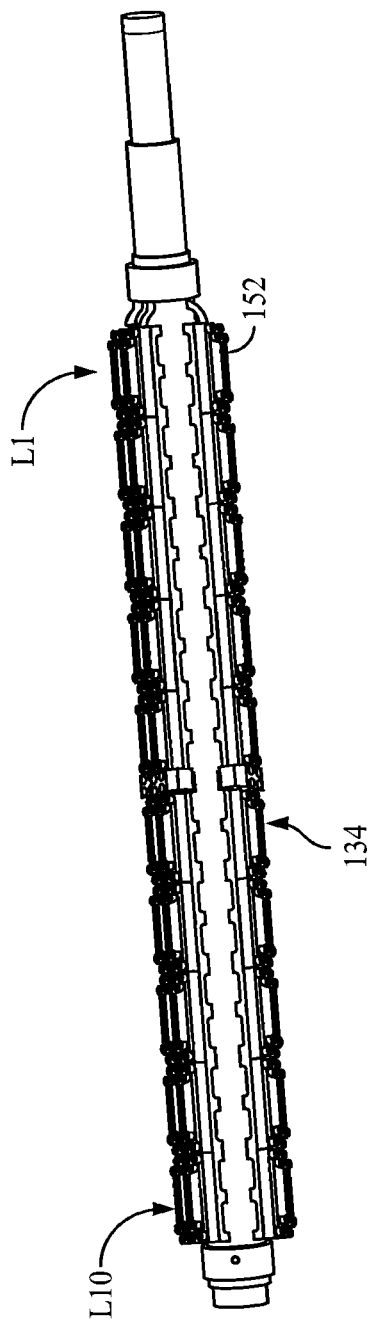
FIG. 10A is a perspective view of the anvil-bearing rotor shown in FIG. 7.
Figure 10B:
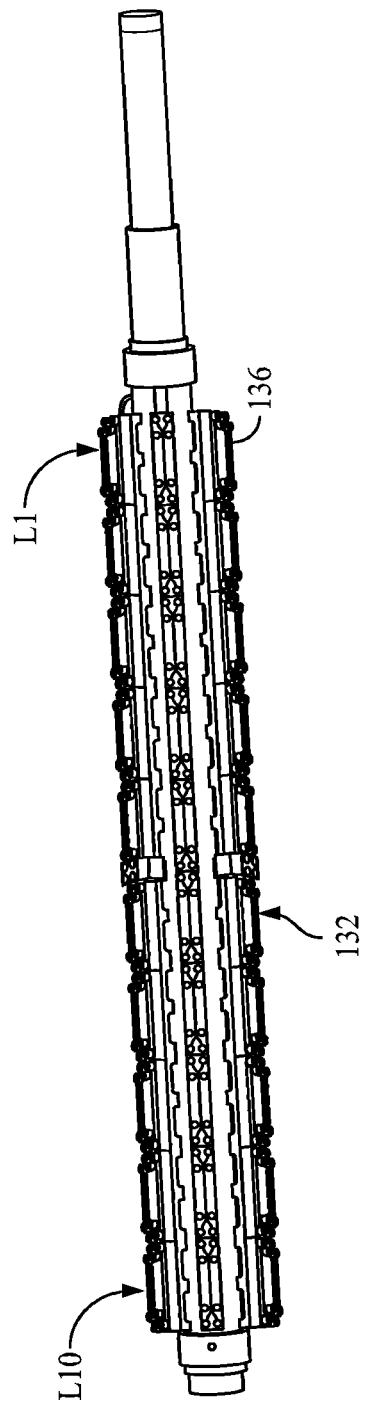
FIG. 10B is a perspective view of the knife-bearing rotor shown in FIG. 7.
Figure 11A:
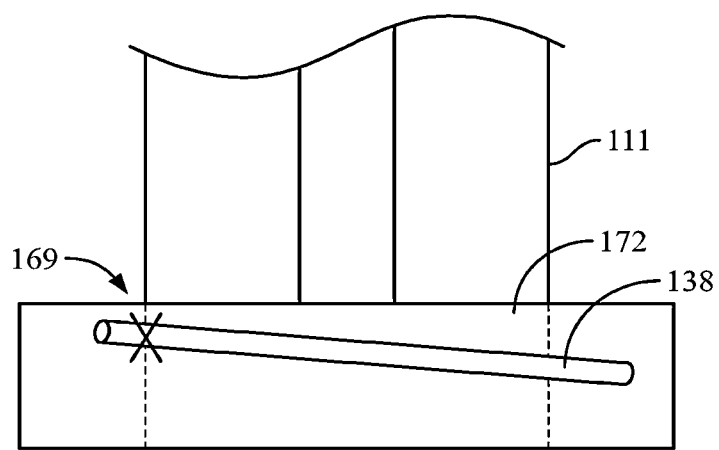
FIG. 11A-C is a planar representation of the progression of cutting action "x" of the knife across a transverse sealed portion of the web.
Figure 11B:
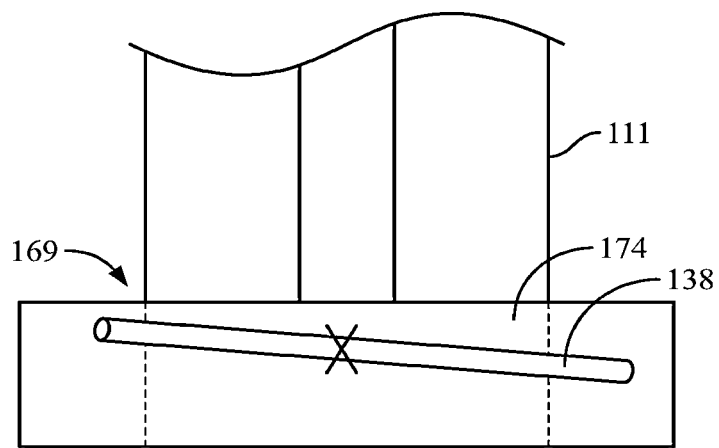
Figure 11C:
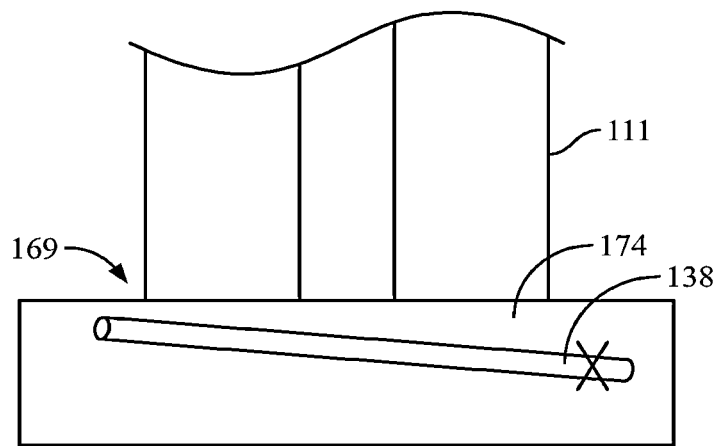

Referring now to FIGS. 7, 10a and 10b, in an embodiment, the knife fixtures 136 of the knife-bearing rotor 132 and the anvil fixtures 152 of the anvil—bearing rotor 134 may be arranged in four rows of ten that are 90° apart from one another, although in different embodiments the number and the angular spacing may differ, so long as upon rotation of the rotors 132, 134, an anvil fixture 152 of the anvil bearing rotor 132 is brought into an opposing relation with a knife fixture 136 of the knife bearing rotor 132 so as to define a nip 169 (FIG. 7) therebetween. The four rows of ten fixtures 136, 152 along the knife-bearing rotor 132 and the anvil—bearing rotor 134, respectively, may correspond in number and location to the number and location of the machine lanes L1 through L10 of the embodiment shown in FIG. 1. It is envisioned that the teachings herein may be practiced with a different number of lanes L, even with but a single lane L, and accordingly, with a corresponding different number of rows of fixtures 136, 152.

In the absence of any pouch material at the nip 169, the metallic sealing jaws 140, 141 of the respective knife fixture 136 come into metal-to-metal contact with metallic, sealing jaws 154, 155 of the anvil fixture 152. One or both of the sets of sealing jaws (140, 141) and/or (154, 155) may be spring-loaded to accommodate for variations in shaft diameter and run out along the shaft bodies 133, 151 of the knife bearing rotor 132 and the anvil bearing rotor 134, respectively. Likewise, at the nip 169 and in the absence of web material, the knife 138 comes into contact with a bearing surface of the anvil body156, with at least one, if not both of the knife 138 and the anvil body 156 being spring-loaded so to accommodate for variations in shaft diameter and run out along the shaft bodies 133, 151 of the knife bearing rotor 132 and the anvil bearing rotor 134, respectively.

The knife 138 and the bearing surface of the anvil body 156 may be polished and/or coated to minimize a freshly formed pouch from sticking thereto.

Referring now to FIGS. 6 and 11A-C, as a knife fixture 136 and an opposing anvil fixture 152 rotate into and through the nip 169, the sets of sealing jaws (140,141) and/or (154,155) come into opposing action against the tubular web form 111 being drawn into the nip 169, which action flattens a transverse portion of the tubular web form 111. The sealing action of the opposing sets of sealing jaws (140,141) and (154,155) establish a transverse sealed region at the nip 169, which region is severed by the action of the knife 138 coming into opposing relation to the anvil body 156. Because the knife 138 is set at a slight angle, the severing includes a scissoring action wherein the cutting action initiates (at "x" in FIG. 11A) on one side of the sealed region 172 and progresses to the other side of the sealed region 172. This action reduces the requisite cutting force and assures a consistent and complete severance at the sealed region 172 by the knife 138. It also accommodates high speed operation of the cutter, such that 150 cycles a minute or higher such that 150 pouches per minute or more may be achieved with the cut and seal station 130. In addition, the disclosed arrangement produces transverse cuts that are straight, properly aligned and even, due at least in part to the metal-to-metal contact of the knife 138 and the anvil body 156 of the disclosed arrangement and the proximity of the knife 138 to the opposing sets of sealing jaws (140,141) and (154,155), which hold the web material in place while cutting proceeds. The metal-to-metal contact of the knife 138 and the anvil body 156 of the disclosed arrangement also abates any need to slow down the rotors 132,134 as they proceed into and through the nip 169 as is often required with rotor knives that work against opposing elastic (silicon) backstops. The disclosed arrangement can operate at a constant (and higher) speed while improving cut quality and consistency and simplifying drive control of the rotors.

Referring again to FIG. 7, in embodiments, the knife-bearing rotor 132 and the anvil— bearing rotor 134 may be driven by a suitable constant speed motor M, whose speed may be optionally selectable to accommodate changes in operating parameters and capabilities, which may be due to changes in product size and/or other specifications. In embodiments, a single motor M drives both rotors 132,134. through a phase-bar/anti-bind linkage 170 between the rotors 132, 134, such that rotors 132, 134 remain in phase with one another throughout start up, steady state operations and interruptions in operation.

Referring to FIG. 7, in embodiments, the pouch catcher/stripper chute 135 of the cut and seal station 130 comprises an open ended box structure supported in a fixed relation to the knife bearing rotor 132 and the anvil bearing rotor 134 such that as a pouch P is formed by the filling, sealing and cutting of an individual pouch P at the rotors 132, 134 and is released therefrom, the pouch P under gravity nominally falls through the catcher/stripper chute 135 to enter the sampling chute 300.

In an embodiment, the pouch catcher/stripper chute 135 comprises a front wall 200, a back wall 202 and side walls 204, 204'. Upper portions 206, 206' of the side walls 204, 204' may each include arcuate edge portions 207, 208 which converge at an apex 209. The arcuate edge portions 207, 208 may generally conform with but are spaced apart from the paths of the outermost portions of the knife fixtures 136 and the anvil fixtures 152 during their rotation, which are represented by dashed lines 211, 210, respectively. So configured, the upper portions 206, 206' serve to prevent any a freshly completed pouch P that deflects side wards off the rotors 132, 134 from escaping.

In addition, the upper edge portions 212, 214 of the front 200 and the back wall 202, respectively are situated in close proximity to the aforementioned paths (arcuate sweep) 211, 210 of the fixtures 136, 152 such that if any freshly completed pouch P were to stick to any of the surfaces of the knife fixture 136 or of the anvil fixture 152, it is stripped or doctored therefrom by contact of the stuck pouch P with the respective upper edge portions 212 or 214 and directed into the pouch catcher/stripper chute 135. For example, should a freshly formed pouch P1 stick to any of the sealing jaws 140, 141 or the knife 138 or any other surface of the knife bearing fixture 136, it is carried along with the respective fixture 136 along the arcuate path 211 until such time the knife fixture 136 moves adjacent the upper edge portion 212 of the front wall 200 of the pouch catcher stripper chute 125, whereupon the freshly formed stuck pouch P1 is released into (and collected by) the pouch catcher/stripper chute 125.

In continuation of this example, should a freshly formed pouch P2 stick to any of the sealing jaws 154, 155 or the anvil 156 or any other surface of the anvil fixture 152, it is carried along with the respective fixture 152 along the arcuate path 210 until such time the anvil fixture 136 moves adjacent the upper edge portion 214 of the back wall 202 of the pouch catcher/stripper chute 125, whereupon the freshly formed stuck pouch P2 is released into the pouch catcher stripper chute 125.

Accordingly, in embodiments, the upper edge portions 212, 214 serve as strippers or doctoring knives to prevent the escape of pouches P that may stick to the elements of the rotors 132, 134. The upper edge portions 212, 214 of the front and back walls 200. 202 together with the arcuate upper portions 206, 206' of the side walls 204, 204' thus assure capture of all of the output of the cut and seal station 130 and assure that the output is directed to the next element of the machine lane L1, which in the disclosed embodiment is a sampler funnel 300.

To further assure that all of the output of the cut and seal station 130 is directed to the next element of the machine lane L1, the pouch catcher/stripper chute 135 may be provided with air jet 220 to sweep (purge) the interior of the pouch catcher/stripper chute 135 of pouches P that would otherwise collect or stick to locations within the pouch catcher/stripper chute. In embodiments, the air jet 220 may comprise downwardly directed nozzle 222 in communication with a source of compressed air or other suitable gas such as nitrogen, under control of a controller C.

In embodiments, a lower portion 230 of the pouch catcher/stripper chute 135 may include angulated front and back walls 232, 234 which are mutually arranged to induce and slightly forward component to the direction of an exiting pouch P3, if desired. In other embodiments, the front wall 200 may include a viewing window made of Plexiglas or other transparent material to facilitate visual monitoring.

In embodiments, the pouch catcher/stripper chute 135 may include discrete stripper and or doctoring units 215 in addition or in lieu of using the upper edge portions 212, 214 to strip stuck pouches from the fixtures 132, 134. In other embodiments the stripper units 215 may comprise air jets.

Referring back to FIG. 6, upon release from pouch catcher/stripper chute 135, a stream of pouches P enter a sampling funnel 300, which is pivotal between a first, operative position at which it directs the stream of pouches P to the next component of the machine lane L and a sampling position wherein sampling funnel 300 directs the stream of pouches away from the next station for sampling or other purposes.

While the sampling funnel 300 is in the operative position, the stream of pouches P proceed to the next component of the machine lane L, which in the disclosed embodiment comprises a transfer funnel 400. In embodiments, the transfer funnel may include a holdback station (gate) 410 to selectively permit or prevent the passage of pouches P through the transfer funnel 400. For example, the gate 410 may be selectively moved between a first position wherein the pouches P are allowed to pass through the transfer funnel 400 to the next component of the machine lane L and a second position wherein further progress of the pouches P is arrested (blocked). The gate 410 may be operative by action of a suitable motor M under the control of the controller C. In embodiments, the controller C may receive signals from a sensor S that counts the number of pouches P which may pass by a sensor eye 420 to control the opening and closing of the gate 410 responsively to the signal from the sensor S. Should a predetermined number of pouches the pass by the sensor eye 420, the controller C the closes the gate 410 until such time that an unloaded container bottom 20 is brought into position at the lane L1. In embodiments, the controller may also open and close the gate responsively to its tracking of the arrival and departure of a container bottoms 20 at the lane L1, such that the gate 410 may be closed in the absence of the can bottom 20 at the lane L1 until such time that a new, unloaded can bottom 20 arrives and is in position to receive pouches P through the transfer funnel 400 and the funnel 38.

Figure 12:
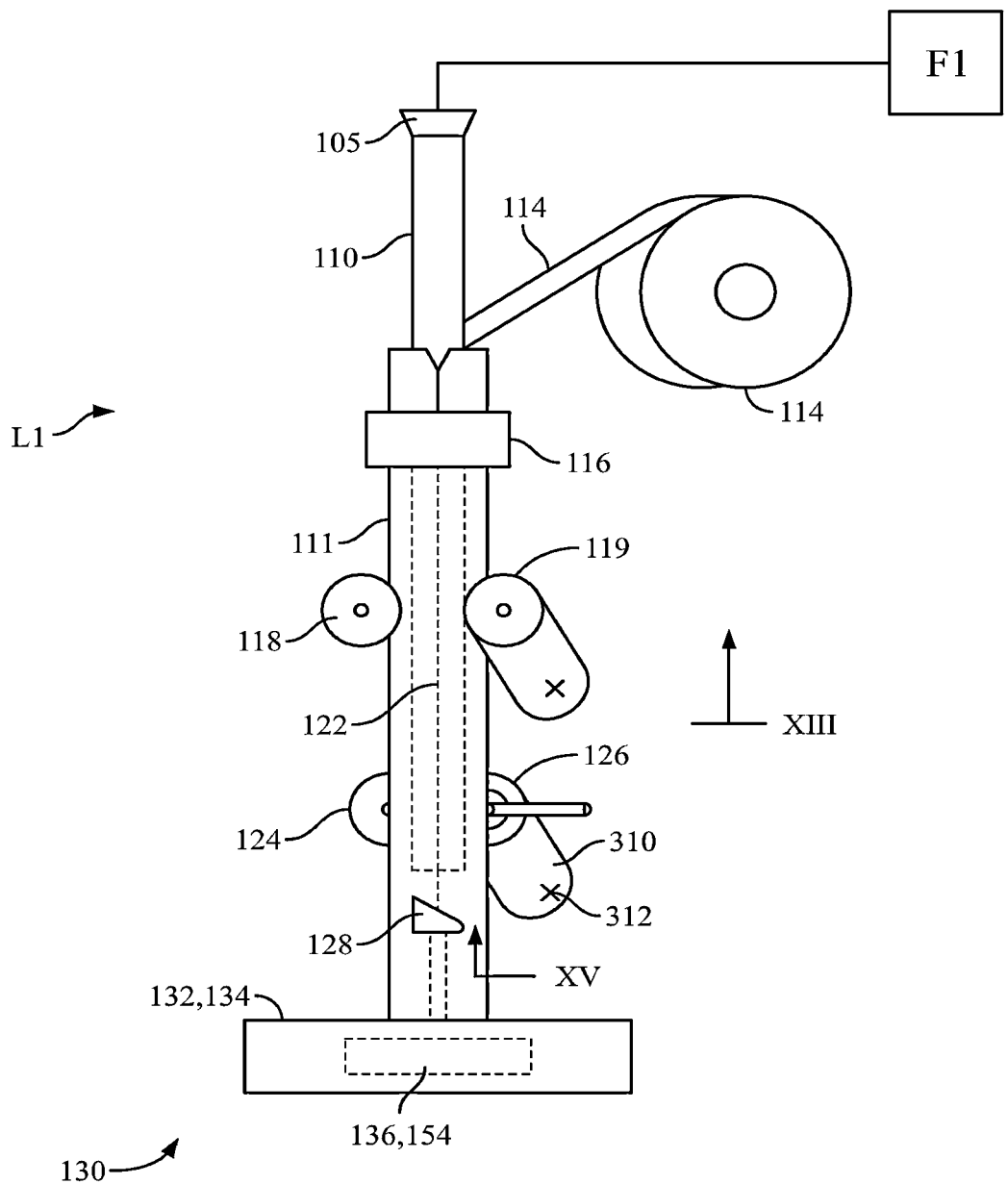
FIG. 12 is a planar frontal view of an upper portion of the pouch making machine lane L1 as viewed in the direction of the double arrow XII-XII in FIG. 6, in accordance with an embodiment of the present disclosure.

Referring now to FIG. 12, an aspect of the present disclosure also provides a system comprising sealing rollers that achieve a more complete and consistent sealing of the fin seam by including an arrangement that overcomes a tendency of the sealing rollers to depart from a squarely opposed surface-to-surface relationship at the nip between their working (bearing) surfaces due to wear and tear upon drive/support components.

More specifically, the present disclosure provides a system for sealing a fin seam, such that in a nominal condition, the working surfaces of the rollers are operative in a squarely opposed face-to-face relation. However, as time passes, wear and tear may loosen the drive and support components of the rollers such that one of the rollers may become canted with respect to the other roller. As a result, the working surfaces of the sealing rollers are no longer squarely opposed but instead are skewed (angulated to one another). When skewed, the rollers lose their capacity to render complete and consistent sealing action along the fin and tend to draw the web unevenly, which further degrades consistency and quality of the fin seam.

The present disclosure provides methods and apparatus wherein a flexible connection is provided between the working surfaces of at least one of the rollers and its connection with its drive mechanism (hub), thereby maintaining the aforementioned nominal or near nominal squarely opposed relation. When implemented, the disclosed arrangement provides improved consistency and robustness in the high speed production of the fin seam and extends the useful service life of the sealing rollers.

Figure 13:
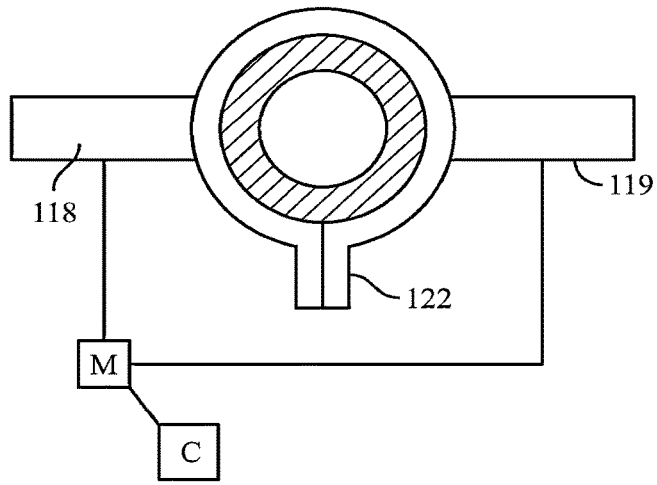
FIG. 13 is a cross-sectional representation of the feed rollers of the upper portion of the pouch making machine lane L1 as viewed in the direction of arrow XIII in FIG. 12.

Referring now to FIGS. 12 and 13, in various embodiments each lane L, such as by way of example L1, may comprise an (inlet) funnel 105 for communicating the output of a tobacco feeder F1 with a feed tube 110 of the lane L1. In embodiments, a continuous ribbon of web 112 may be fed from a source of web such as a bobbin 114 to a folding collar 116 which is configured at a location along the feed tube 110 to fold the continuous web 112 into a tubular web form 111 about the exterior of the feed tube 110. A pair of drive (drawing) rollers 118, 119 that are biased against the feed tube 110 may be used to draw the tubular web form 111 downwardly along the feed tube 110 toward a cut and seal station 130. The cut and seal station 130 may comprise a knife-bearing rotor 132 and an anvil-bearing rotor 134 and a pouch catcher/stripper chute 135 as previously described. In an embodiment, the cutting and sealing may instead be performed at separate stations. A suitable motor M may controllably drive the drive rollers 118, 119. The motor M may be controlled and synchronized via signals from a controller C. Each drive roller 118, 119 may be driven separately or by a single motor through a suitable drive link.

Figure 14:
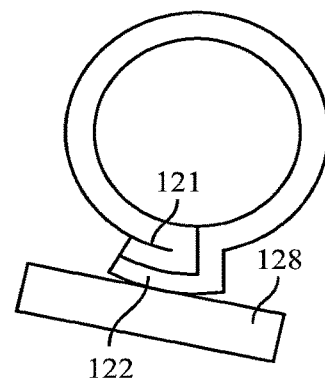
FIG. 14 is a representation of the plow of the upper portion of the pouch making machine lane L1 as viewed in the direction of arrow XV in FIG. 12.

In embodiments, the folding collar 116 is configured to form a fin seam 122 by outwardly folding longitudinal edge portions of the continuous ribbon of web 112 into a mutually opposing relation. The resultant fin 122 is then sealed together as the fin 122 is drawn through opposing, sealing rollers 124, 126 while at least one of which is being heated. Thereupon the fin 122 may be folded over against adjacent regions 121 of the tubulin web form 111 by a plow 128 or other suitable folding device (FIG. 14). In other embodiments, the folding collar 116 may be configured to fold the continuous web 112 into a tubular body having a lapped seam, wherein a heated roller, which is biased against an adjacent portion of the feed tube 110, thermo-mechanically seals the lapped seam.

Figure 15:
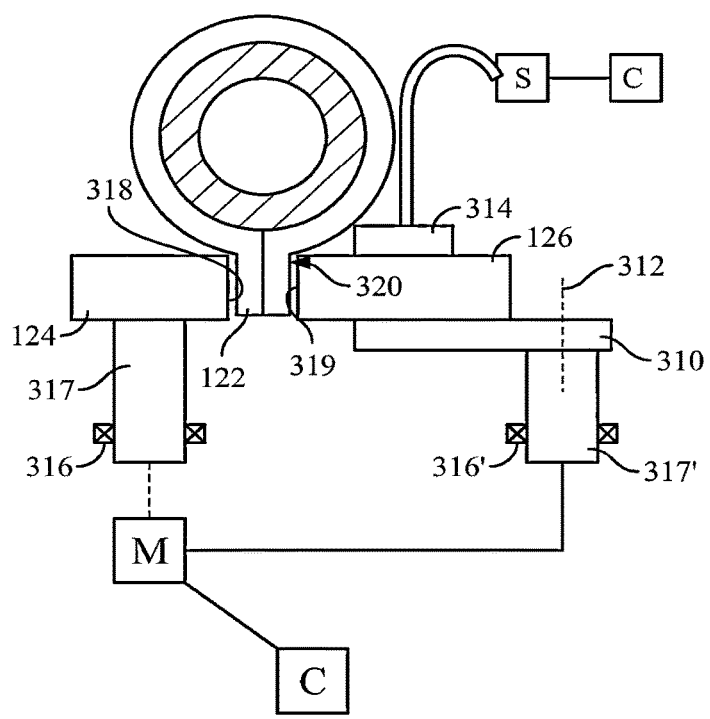
FIG. 15 is a representation of the sealing rollers of the upper portion of the pouch making machine lane L1 as viewed in the direction of arrow XV in FIG. 12.

Referring now to FIG. 15, in an embodiment, the right handed roller 126 may be pivotally mounted to the machine frame of lane L1 on a pivotal arm 310 which is movable about a pivot axis 312, which allows the roller 126 to be retracted and re-engaged during operations, such as a shutdown and a start up of lane L1. The right-hand roller 126 is heated by an electrical a resistive heater 314 which is connected to a source of electrical power S under the control of a controller C. The right-hand roller 126 may be driven by a suitable motor M under the control of a controller C. The motor M may also drive the left-hand roller 124 through a suitable drive linkage, such as an anti-skip/anti-bind drive linkage, which may include suitable cogbelts and spur gears. Alternatively, either one of the rollers 124, 126 may be driven by separate motors and with which are controlled and synchronized by the controller C.

Each of the rollers 124, 126 may be rotationally supported with suitable journals or bearings (supports) 316, 316, respectively. When engaged, the working surfaces 318, 319 of the rollers 124, 126 are urged toward each other against opposite sides of the fin 122 and the heat communicated to the surface 319 from the heater 314 of the right-hand roller 126 is sufficient to thermo-mechanically seal the fin 122 as the fin 122 is drawn through the nip 320 between the sealing rollers 318, 319. Nominally, the supports 316, 316 maintain the sealing rollers 124, 126 in a mutually opposing relation such that their working surfaces 318, 319 are in a nominal, squared-off, face-to-face relation such that plane of the working surfaces 318, 319 at the nip 320 are parallel to one another.

Figure 16:
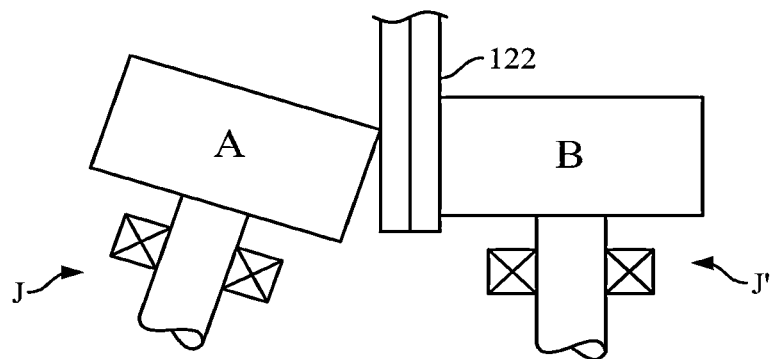
FIG. 16 (prior art) is a representation of sealing rollers in a condition of the extended use and in the absence of the teachings herein.

Referring now to FIG. 16 (prior art), it has been discovered that as the machine L1 is operated, the journals (or bearings) J, J' and other drive components between the motor and the rollers A, B would loosen or otherwise degrade allowing at least one of the rollers such as roller A in FIG. 16 to cant (skew) as shown in FIG. 15 away from the nominal, squared off face-to-face relation. When skewed, the rollers A, B of the prior art would impart an uneven/misaligned pressing action which would degrade the quality, strength and consistency of the seal along the fin 122. The misalignment of the rollers A and B would also cause the rollers A and B to pull on the paper unevenly, which would degrade proper tracking of paper through the rollers A, B.

Figure 17A:
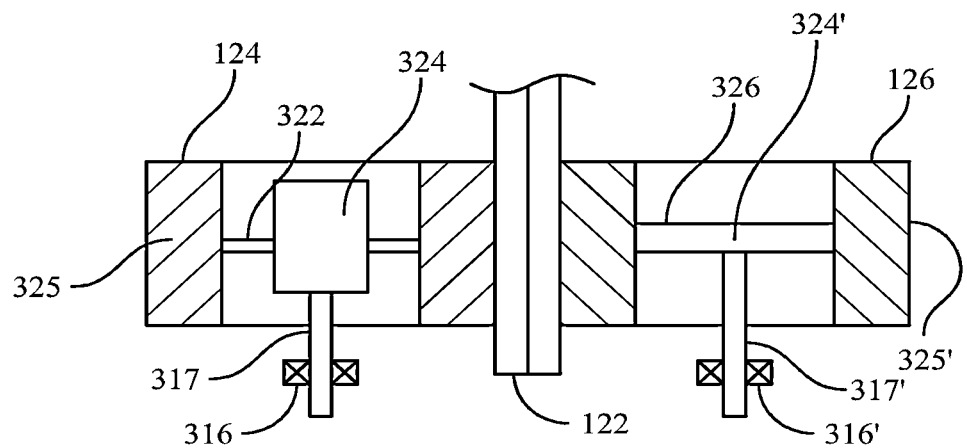
FIG. 17A is a cross-sectional representation of sealing rollers which include a flexible connection in accordance with an embodiment of the teachings herein.

Referring now to FIG. 17A, the present disclosure provides an arrangement to overcome the aforementioned deficiencies in the prior art as described in reference to FIG. 16. In the disclosed arrangement, the left hand roller 124 may comprise a rotationally hub portion 324 which may be driven or undriven, a rigid outer annulus 325, which provides the working surface 318, and a flexible connection 322 that is operative between the hub portion 324 and the outer rigid annulus 325 of the roller 124. In embodiments, the right hand roller 126 may also be provided with a rigid connection 326 between its hub portion 324' and a rigid outer rigid annulus 325' of the roller 126. In other embodiments, the right hand roller 126 may be provided with a flexible connection 322' such as described with reference to the roller 124, such that rollers 124, 126 both have a flexible connection 324, 324', respectively.

Figure 17B:
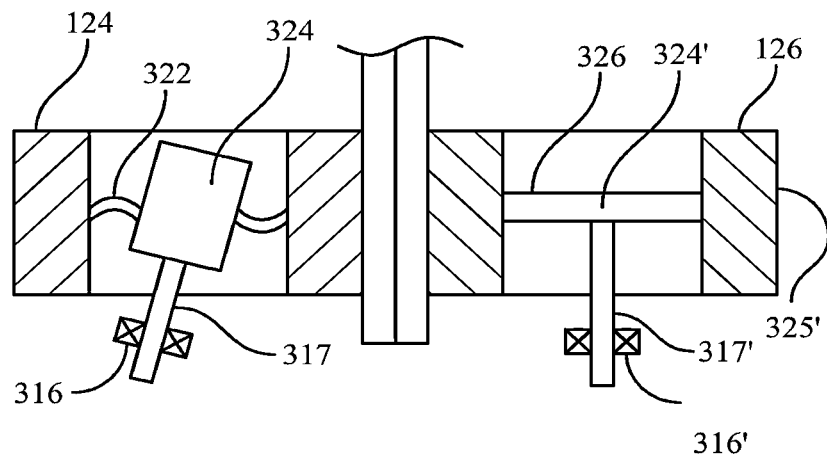
FIG. 17B is a cross-sectional representation of sealing rollers which include a flexible connection in accordance with the embodiment of FIG. 17A, after extended use.

Referring now to FIG. 17B, with the disclosed arrangement, as the drive linkage and/or the bearings, journals 316 of the roller 124 become worn or otherwise loose, the flexible connection 322 dissipates tendency of such condition to cant the roller 124 such that the nominal squared off face-to-face relation between this working surfaces 318, 319 at the nip 320 is maintained. With such action, the integrity of the seal along the fin 122 is conserved and product quality, i.e. a consistent, complete sealing of the fin 122, is maintained. Proper paper tracking though the nip 320 between the sealing rollers124, 126 is also maintained.

It is contemplated that in an embodiment such as shown in FIG. 15, the roller 126 may be provided with a drive connection (including a drive shaft 317', bearings 316' and other components) that become loose upon extended or heavy use, causing the roller 126 to cant away from its nominal position as shown in FIG. 15. The opposing roller 124, being provided with a flexible connection 322 as previously described, has the capacity to cant responsively to the canting the roller 326 to maintain nominal face-to-face relationship between the working surfaces 318, 319 of the rollers 124, 126, thereby maintaining complete, consistent sealing and proper paper tracking.

Referring now to FIGS. 18A-C, in an embodiment, the roller 324 may comprise a floating roller assembly 124' whose components include a hub sleeve (hub) 400, a floating roller 402, a key 404 drivingly connecting the hub sleeve 400 with an end portion 321 of the drive shaft 317, a drive pin 403 arranged to drivingly connect the roller 402 with the hub sleeve 400 at an aperture 405 provided in the floating roller 402, a retention cap 408 and a threaded fastener 410 adapted to affix the retention cap 408 to the end portion 321 of the drive shaft 317 in an axial registration relative to the floating roller 402 such that clearance is provided between the floating roller 402 and components adjacent to it. In embodiments, an axial clearance may be provided between the floating roller 402 and axially adjacent portions of the cap 408 and/or the hub 400 and a radial clearance may be provided between the floating roller 402 and radially adjacent portions of the end portion 321 of the drive shaft 317 and/or the retention cap 410. The diameter of the aperture 405 in the roller 402 is oversized relative to the diameter of the drive pin 403 such that a flexible drive pin connection 412 is established between the hub sleeve 400 and the roller 402. Should the floating roller 402 need to cant to compensate for a canting of the other, opposing roller 126, it may do so by reason of the aforementioned clearances and the aforementioned flexible drive pin connection 412. The drive pin 403 may be press fitted into a hole 414 provided in the hub sleeve 400 or otherwise affixed to the hub 400 by a suitable connection such as threaded connection, a twist-lock, a detent or the like. In an embodiment, the retention cap 408 may partially overlap the aperture 405 of the roller wheel 402 as a further measure to assure that the drive pin 403 remains operatively in place. In embodiments, the floating roller 402 includes a rigid outer annulus 325 as described in reference to FIG. 17A.

Figure 18D:
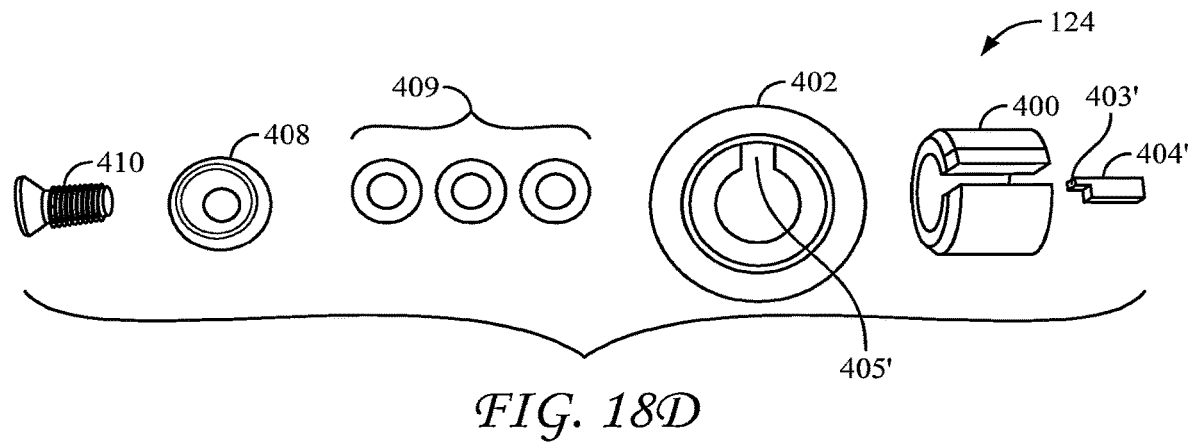
FIG. 18D is an exploded view of a roller assembly constructed in accordance with another embodiment of the disclosure.

Referring now to FIG. 18D, alternatively, an embodiment may be provided with a key 404' which includes an axial finger (drive pin) 403' that is operative like the drive pin 403 described in reference to FIGS. 18A-C, except that the drive pin 403' and the key 404' of FIG. 18D are integrated. The main body of the key 404' rotationally affixes the hub sleeve 400 with the end portion 321 of the drive shaft 317 and the axial extension 403' fits into an aperture (notch) 405' of the floating roller 402' with clearance so as to create a flexible drive pin connection 412'. In embodiments, one or more spring washers 409 may be disposed between the retention cap 408 and the end portion 321 of the drive shaft 317 to provide a desired spacing and/or biasing of the retention cap 408.

Figure 19A:
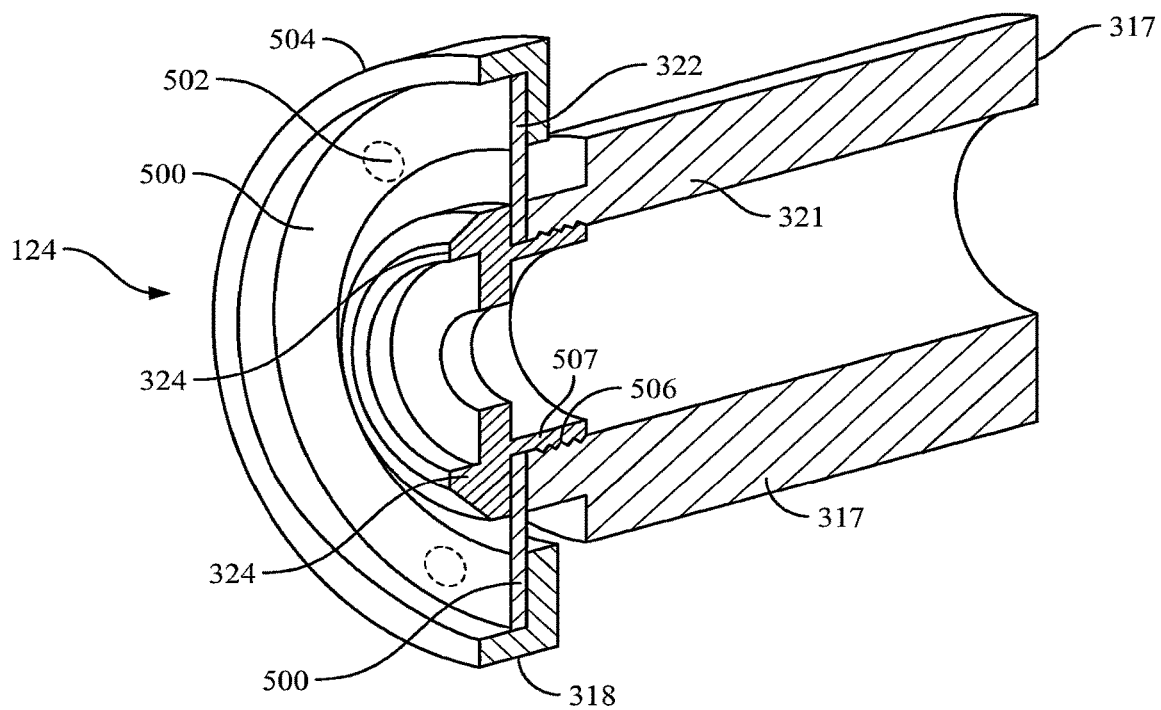
FIG. 19A is a perspective cutaway view of a roller assembly constructed in accordance with another embodiment of the disclosure.

Referring now to FIG. 19A, in another embodiment, the flexible connection 322 comprises a disc 500 of a resilient material such as a spring steel. The disc 500 is connected to the rigid outer annulus 325 by a plurality of removable connectors 502 (such as small bolts, screws, pins and the like). The radially inward portion of the spring steel disc 500 is retained by the hub (cap) 324 against the end portion 321 of the shaft 317, such as by way of a threaded connection 506 between an annular flange 507 of the hub 324 and an end portion 321 of the shaft 317 upon which the roller 124 is mounted. Upon tightening, the threaded connection clasps and registers the spring steel disc 500 between the hub 324 and an end portion of the shaft 317. With the described arrangement, the disc 500 may be changed readily so as facilitate replacement of worn out discs and/to change the flexibility of the flexible connection 322 by replacing a given disc 500 with one of a greater or lesser flexibility.

Figure 19B:
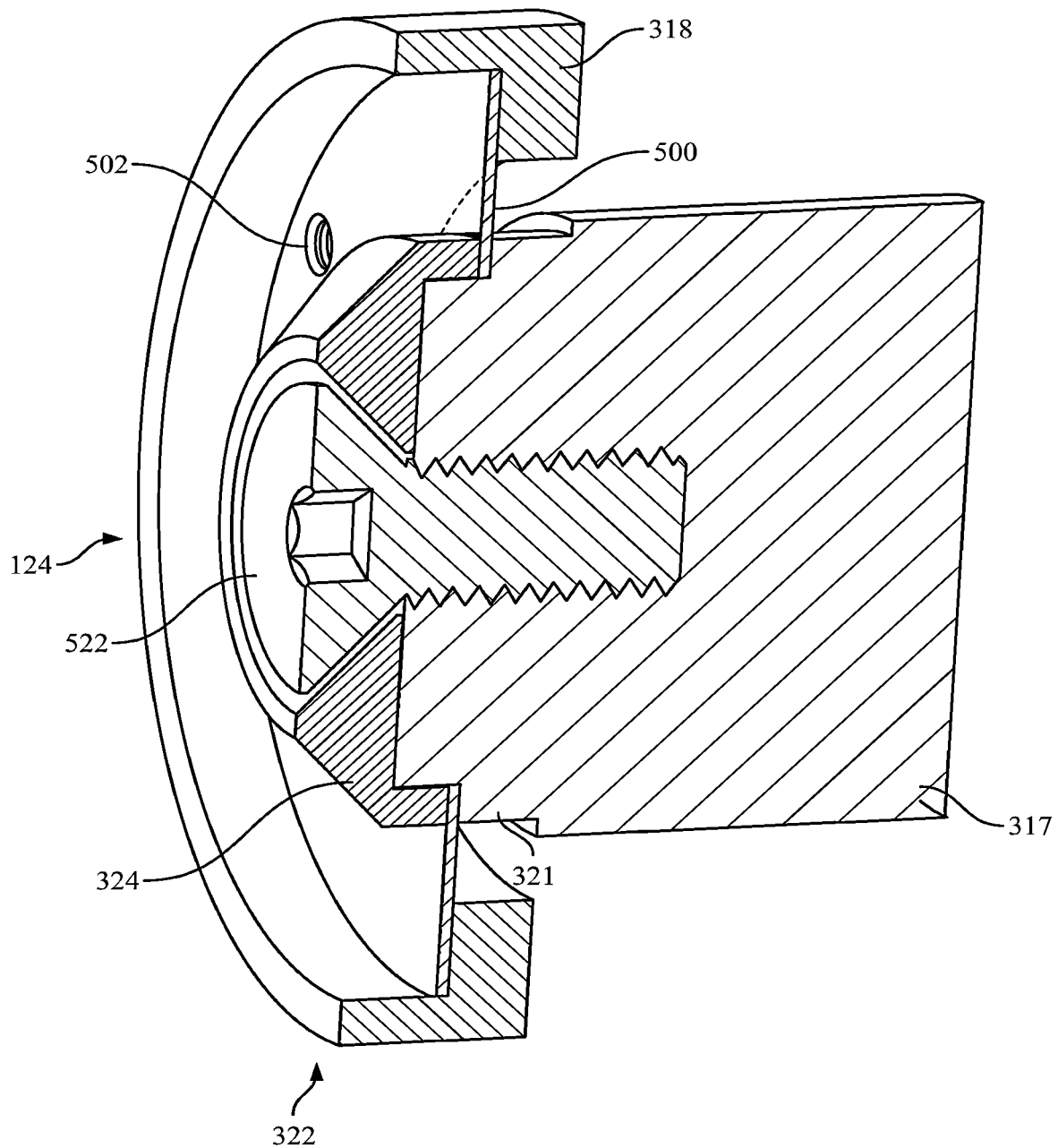
FIG. 19B is a perspective cutaway view of a roller assembly constructed in accordance with another embodiment of the disclosure.

Referring now to FIG. 19B, another embodiment flexible connection 322 comprises a disc 500 configured as described in previous embodiments with reference to FIG. 19A, but where a fastener 522 secures the cap (hub) 324 to the end portion 321 of the drive shaft 317.

Figure 20A:
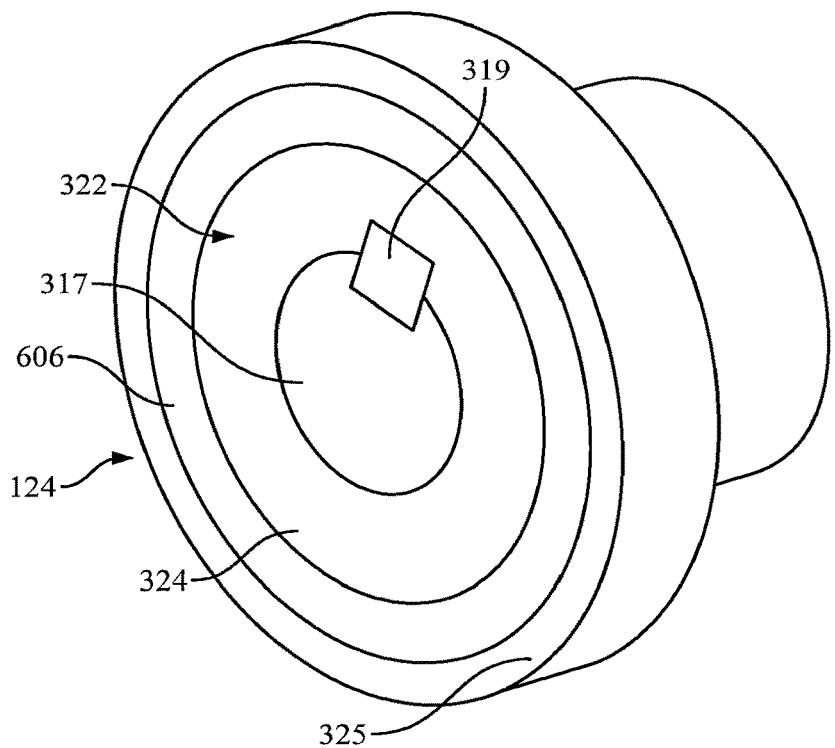
FIG. 20A is a perspective view of a roller assembly constructed in accordance with yet another embodiment of the disclosure.
Figure 20B:
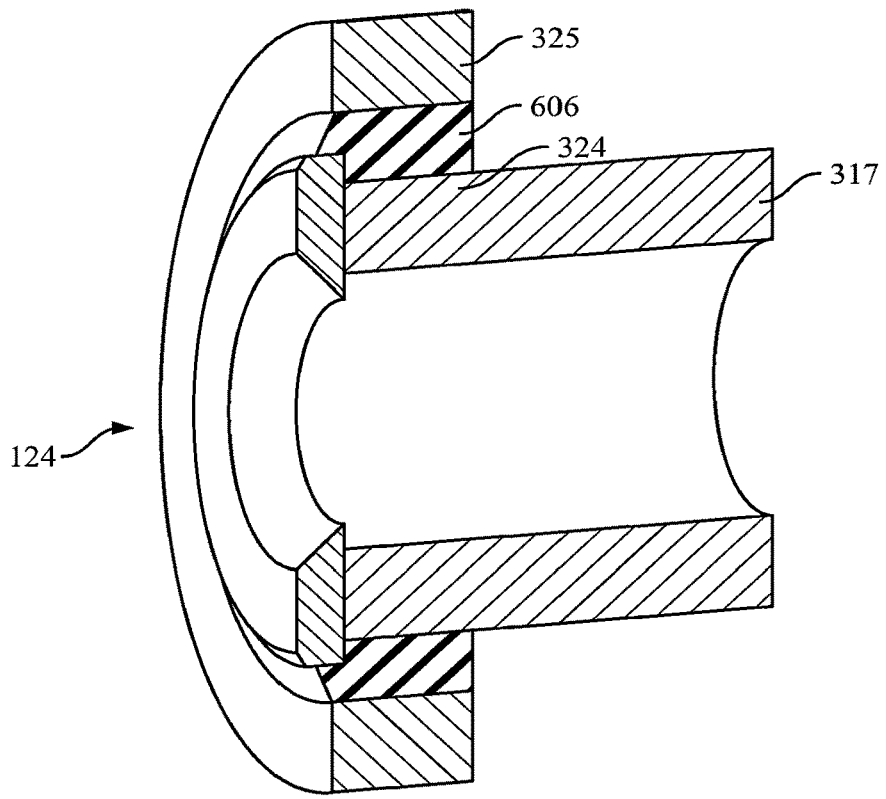
FIG. 20B is a cutaway perspective view of a roller assembly constructed in accordance with still another embodiment of the present disclosure.

Referring now to FIG. 20A, in another embodiment, the roller 124 comprises an outer rigid annulus 325, a hub 324 which may be connected to the drive shaft 317 with a key 319. A flexible connection 322 is established between the hub 324 and the outer rigid annulus 325 with an annular body 606 of resilient, elastomeric material. The annular body of resilient, elastomeric material 606 may molded into the confines between the hub 324 and the outer rigid annulus 325. As shown in FIG. 20B, alternatively, the annular body of resilient, elastomeric material 606 may comprise a preformed, silicone washer that is fitted and retained between the hub 324 and the outer rigid annulus 325.

In embodiments, the flexible connection 322 between a hub portion of the roller 124 and its outer rigid annular element 325 may comprise a discrete cylindrical piece which connects to an end portion of the shaft 317. In other embodiments, an end portion 321 of the drive shaft 317 may define at least in part the hub portion of the roller 124 as described herein. The flexible connection 322 maintains the desired squared-off, face-to-face relation between working surfaces 318, 319 of the two rollers 124, 126 at the nip 320 so as to consistently achieve a complete and robust seal along the fin 122.

Figure 21:
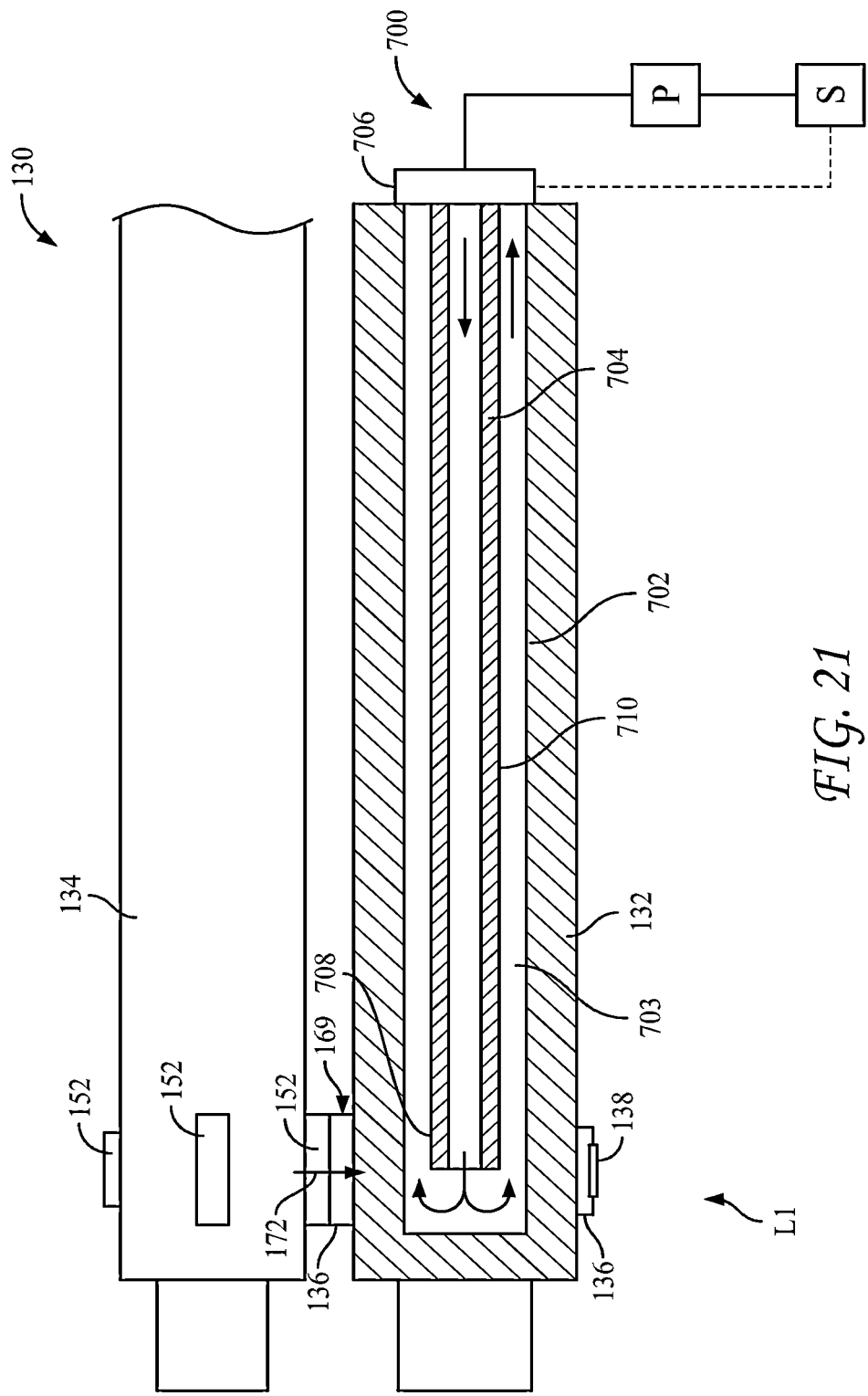
FIG. 21 is side view of rotors and a cooling system in accordance with an embodiment of the present disclosure, with one of the rotors and certain components of the cooling system being shown in cross section.

Referring now to FIG. 21, in an embodiment, the cut and seal station 130 may include a rotor cooling system 700 arranged to circulate a coolant fluid (such as water or air) through one of the rotors 132, 134 such as the knife bearing rotor 132 by way of example. The cooling system 700 is arranged and operated such that a temperature differential (difference) is established between the knife bearing fixture 136 and the anvil bearing fixture 152 at the nip 169 to promote establishment of a more immediate and robust seal.

In an exemplary embodiment the rotor cooling system 700 may be applied to the knife bearing rotor 132 (but not the anvil bearing rotor 134), whereby the heater element 144 and the coolant system 700 maybe operated to bring the the sealing jaws 140, 141 of the knife bearing rotor 132 to a desireable, lower operating temperature relative to the operating temperature of the heated (uncooled) sealing jaws 154,155 of the anvil bearing rotor 134. The resultant difference in operating temperature may be utilized to drive a transfer of heat from more heated sealing jaws 154,155 of the anvil bearing rotor 134 across the web being sealed to the less heated sealing jaws 140, 141 of the knife bearing rotor 132. The metallic (heat conductive) nature of both sets of sealing jaws 140, 141 and 154,155 facilitates establishment of the aforementioned temperature differential and heat transfer.

In an embodiment, the rotor cooling system 700 may comprise a longitudinal channel 702 extending into the knife rotor 132 into which is extended is a coaxial conduit (pipe) 704. In embodiments, the knife rotor 132, the channel 702 and the conduit are mutually concentric, and the channel 702 may extend approximately 80% of the working extent of the knife rotor 132 (e.g. 80% of the extent of lanes L1-L10 of the exemplary embodiment). A distal end portion 708 of the conduit 704 may terminate short of the full extent of the channel 702 such that the conduit 704 is open ended within the channel 702. Coolant fluid such as water may be pumped from a source S by a suitable pump P into the conduit 704 by a suitable rotary coupling 706 that communicates with the conduit 704. At the distal end portion 708 of the conduit 704, the coolant flow may discharge from the conduit 702 and return as a reversed flow along an annular channel 703 defined between the exterior 710 of the conduit 704 and an interior surface 712 of the channel 702. At the rotary coupling 706 the reversed flow of coolant may be discharged or directed back to the source S for recirculation. In embodiments, recirculation may include a suitable heat exchanger, filter and/or a flow controller. The conduit 704 may be affixed to the knife rotor 132 so as to rotate therewith or be suspended by suitable supports such that conduit 704 remains fixed while the knife rotor 132 rotates about the conduit 704.

The coolant flow established by the rotor cooling system 700 reduces the temperature of the knife bearing fixture 136 relative to the anvil bearing fixture 152 at the nip 169 such that a thermal differential is established at the nip 139 such that heat may be favorably drawn in the direction of arrow 712 from the hotter, anvil bearing fixture 152 of the anvil rotor 134 through the paper seal at the nip 169 into the cooler knife bearing fixture 136 of the knife rotor 132. The thermal differential may be configured to promote a consistent sealing operation and potentially allow for a lower total operating temperature at the nip 169 and along the knife rotor 132. When the knife rotor 132 is disposed on the "operator side" of the machine, cooling of the knife rotor 132 with the cooling system 700 may help abate thermal risks/discomforts to machine operators during machine operations. The cooling system may be also be configured and operated to make the process more forgiving as to variations in heat generation and transfer from the heater elements 144,160 of the knife bearing and anvil bearing fixtures 136,152, respectively.

It is envisioned that the rotor cooling system 700 may be applied instead or in addition to the anvil bearing rotor 134. In all applications, the heaters 144 of the knife bearing fixtures 136 and the heaters 160 of the anvil bearing fixtures 152 could be operated as described previously or that one or the other may be operated in a reduced capacity or not at all so as to optimize heat transfer at the nip 169 and for other purposes such as described with regard to the cooling system 700.

It is contemplated that all of the above teachings herein would have applications in the manufacture and packaging of various (different) pouched articles of various (different) contents, sizes and layouts in addition to those specifically disclosed herein; and that the teachings herein would have applications to various containers for the pouched articles of various (different) sizes, shapes and configurations in addition to those specifically described herein.

US/PCT 1. A method of forming a stream of individual packets comprising: rotating a knife, an anvil and sealing jaws into opposing relation at a nip; continuously forming a tubular web structure and drawing the continuously formed tubular web structure to the nip; repetitively sealing the continuously formed tubular web structure transversely at the nip by rotating sealing jaws into opposing relation at the nip so as to seal a transverse portion of the tubular web structure; severing the continuously formed tubular web structure at a location along the transverse sealed portion by rotating the anvil and the knife into an opposing relation at the nip against the transversely sealed portion so as to form a severed, completed packet beyond the nip, whereby a stream of completed packets is established; and further rotating the anvil, the knife and the sealing jaws into a proximal relation to a stripper element, whereby, should a completed packet stick to any of the anvil, the knife and/or the sealing jaws, the stripper element releases the stuck completed packet from the anvil, the knife and/or the sealing jaw.

US/PCT 2. The method of US/PCT 1, wherein the repetitively sealing and severing also forms a partially closed packet structure adjacent the nip, the continuously forming a tubular web structure including forming the tubular web structure about a feed tube, the method further comprising feeding through the feed tube a charge of flowable material into the partially closed packet structure concertedly with the repetitively sealing and severing.

US/PCT 3. The method of US/PCT 1, wherein a speed of the rotating of the sealing jaws, the anvil and the knife is maintained constant, including constant speed of rotation through the nip.

US/PCT 4. The method of US/PCT 3, wherein the rotating of a knife, an anvil and sealing jaws into opposing relation at a nip comprises rotating a first rotor and a second rotor while supporting the knife and a first set of the sealing jaws on the first rotor and supporting the anvil and a second set of the sealing jaws on the second rotor and while spring loading the knife, the anvil and at least one of the first and second sets of the sealing jaws.

US/PCT 5. The method of US/PCT 4, wherein the knife, the anvil and the first and second sets of the sealing jaws are constructed from a hardened metal, whereby the hardened metal, the constant speed of rotor rotation and the spring loading of the knife, the anvil and at least one of the first and second sets of the sealing jaws facilitate a higher speed of the sealing and severing at the nip than an operation lacking the hardened metal, the constant speed of rotor rotation and the spring loading.

US/PCT 6. The method of US/PCT 5, wherein the severing includes severing with a scissoring action wherein the severing initiates on a side of the sealed portion of the tubular web structure and progresses across the sealed portion to an opposite side as the knife is rotated through the nip, the scissoring action includes rotating a blade of the knife about an axis while maintaining the knife blade at an angle with respect to the axis.

US/PCT 7. The method of US/PCT 6, wherein the angle is in the range of approximately 2 to approximately 6 degrees.

US/PCT 8. The method of US/PCT 1, further comprising catching the severed, completed packets beyond the nip with a packet catcher having a lip, wherein the lip operates as the stripper.

US/PCT 9. The method of US/PCT 8 further comprising entraining completed packets by discharging a stream of gas downwardly into the catcher, whereby the catcher is cleared of completed packets through an open end of the catcher below the nip.

US/PCT 10. The method of US/PCT 5, wherein the rotating of the sealing jaws, the anvil and the knife include rotating first and second rotors while supporting the knife on the first rotor between members of the first set of sealing jaws and supporting the anvil and on the second rotor between members of the second set of sealing jaws.

US/PCT 11. The method of US/PCT 10, wherein the supporting of the knife and a first set of sealing jaws includes spring loading the knife and wherein the supporting of the anvil and the second set of sealing jaws includes spring loading both the anvil and the second set of sealing jaws.

US/PCT 12. The method of US/PCT 11, wherein the supporting of the knife includes supporting a blade of the knife at an angle with respect to an axis of rotation of the first rotor.

US/PCT 13. The method of US/PCT 8, further comprising directing the stream of completed packets through a pivotable sampling funnel and controllably pivoting the sampling funnel to and from a first position and a second position, when at the first position the sampling funnel directing the stream of completed packets in a first direction toward a packet receiving location for a container and when at the second position the sampling funnel diverting the stream of completed packets in a second direction away from the packet receiving location for a container.

US/PCT 14. The method of US/PCT 13, further comprising directing the stream of completed packets through a gated transfer funnel comprising a gate, including holding back the stream of completed packets within the gated transfer funnel by closing the gate when a container is absent from the packet receiving location and including opening the gate when a container is positioned at the packet receiving location.

US/PCT 15. The method of US/PCT 14, further comprising counting the number of completed packets passing by a location along a path to the packet receiving location and controllably operating at least one of the sampling funnel and the gate of the gated transfer funnel to control delivery of completed packets to a container at the packet receiving location in accordance with a predetermined number of packets.

US/PCT 16. The method of US/PCT 15, further comprising delivering completed packets to a container in accordance with a predetermined number of packets at the packet receiving location and thereafter controllably moving the container from the packet receiving location to a second location and tamping the delivered completed packets at the second location.

US/PCT 17. The method of US/PCT 16, further comprising executing a weight check upon the container beyond the second location, and adjusting the feeding of the flowable material responsively to the weight check so as to maintain consistency of the feeding.

US/PCT 18. The method of US/PCT 17, wherein the delivery includes simultaneously delivering to a set of containers with multiple streams of individual packets at a plurality of the packet receiving locations and thereafter controllably moving the set of containers from the plurality of packet receiving locations to a plurality of the second locations and simultaneously tamping the delivered completed packets of the set of containers at the plurality of second locations.

US/PCT 19. The method of US/PCT 2, wherein the continuous formation of a tubular web structure includes forming the tubular web structure with a radially outwardly directed fin by mutually superimposing longitudinal edge portions of the tubular web structure and sealing the radially outwardly directed fin by directing the fin through a nip between first and second fin sealing rollers while communicating heat to the fin through at least one of the fin sealing rollers.

US/PCT 20. The method of US/PCT 19 further comprising maintaining a nominal face-to-face relation between outer annulus of the first fin sealing roller and an outer annulus of the second fin sealing roller by flexibly connecting a hub component of the second fin sealing roller with the outer annulus of the second fin sealing roller, whereby consistent sealing of the fin is enhanced.

US/PCT 21. The method of US/PCT 4 further comprising establishing a temperature difference at the nip by cooling at least one of the first and second rotors.

US/PCT 22. The method of US/PCT 2, wherein the flowable material comprises tobacco.

US/PCT 23. An apparatus for forming a stream of individual packets, comprising: a folder arranged to form a tubular web structure from a continuous ribbon of web; a feeder arranged to feed the formed tubular web structure along a path to a nip; a first rotor comprising a first sealing jaw and a knife adjacent the first sealing jaw; a second rotor comprising a second sealing jaw and an anvil adjacent the second sealing jaw; the first and second rotors mutually arranged so that upon rotation of the first and second rotors: the first and second sealing jaws rotate into opposing relation at the nip so as to seal a transverse portion of the tubular web structure; the knife and the anvil rotate into an opposing relation at the nip to sever the transversely sealed portion so as to form a severed, completed packet beyond the nip; and an open ended packet catcher adjacent the first and second rotors and arranged to catch the severed, completed packets beyond the nip whereby a stream of packets is established, the packet catcher including a stripper disposed in a proximal location to at least one of the anvil, the knife and the sealing jaws when the anvil, the knife and/or the sealing jaws are rotated beyond the nip, whereby, should a completed packet stick to any of the anvil, the knife and/or the sealing jaws, the stripper is operative to free the stuck packet from the anvil, the knife and/or the sealing jaw.

US/PCT 24. The apparatus of US/PCT 23, wherein the sealing and severing also forms a partially closed packet structure adjacent the nip, the folder arranged to form a tubular web structure about a feed tube, the apparatus further comprising a material feeder arranged to feed through the feed tube a charge of flowable material into the partially closed packet structure concertedly with the sealing of the sealing jaws and severing of the knife and anvil.

US/PCT 25. The apparatus of US/PCT 23, further comprising an arrangement to control rotation of the first and second rotors such that the sealing jaws, the anvil and the knife are rotated at a constant speed, including constant speed of rotation through the nip.

US/PCT 26. The apparatus of US/PCT 25, wherein at least one of the knife and the anvil are spring loaded and at least one of the first and second sealing jaws are spring loaded and wherein the knife, the anvil and the first and second sealing jaws are constructed from a hardened metal, whereby the hardened metal, the constant speed of rotor rotation and the spring loading facilitate a higher speed of the sealing and severing at the nip than an operation lacking the hardened metal, the constant speed of rotor rotation and the spring loading.

US/PCT 27. The apparatus of US/PCT 23, wherein the severing includes severing with a scissoring action wherein the severing initiates on a side of the sealed portion of the tubular web structure and progresses across the sealed portion to an opposite side as the knife is rotated through the nip.

US/PCT 28. The apparatus of US/PCT 27, wherein the scissoring action includes rotating a blade of the knife about the axis of rotation of the first rotor while maintaining the knife blade at an angle with respect to the axis of rotation.

US/PCT 29. The apparatus of US/PCT 28, wherein the angle is in the range of approximately 2 to approximately 6 degrees.

US/PCT 30. The apparatus of US/PCT 23, wherein the packet catcher further comprises an arrangement to discharge a stream of gas downwardly into the packet catcher, whereby the packet catcher is cleared of completed packets through an open end of the catcher below the nip.

US/PCT 31. The apparatus of US/PCT 24, wherein the packet catcher comprises a side wall having an arcuate upper wall portion configured to prevent a completed packet from escaping sideways.

US/PCT 32. The apparatus of US/PCT 31, further comprising a spring loaded mount between the first rotor and the knife and a spring loaded mount between the second rotor and both the anvil and the second sealing jaw and wherein the mount of the knife maintains a blade of the knife at an angle with respect to an axis of rotation of the first rotor.

US/PCT 33. The apparatus of US/PCT 24, further comprising a pivotable sampling funnel positioned to receive the stream of completed packets and controllable pivot operative to pivot the sampling funnel to and from a first position and a second position, when at the first position the sampling funnel operative to direct the stream of completed packets in a first direction toward a packet receiving location for a container and when at the second position the sampling funnel operative to divert the stream of completed packets in a second direction away from the packet receiving location.

US/PCT 34. The apparatus of US/PCT 33, further comprising a gated transfer funnel positioned to receive the stream of completed packets, the gated transfer funnel including a hold-back gate operative to retain members of the stream of completed packets within the gated transfer funnel upon closure of the gate when a container is positioned other than at the packet receiving location and the gate being controllably opened when a container is positioned at the packet receiving location.

US/PCT 35. The apparatus of US/PCT 34, further comprising a counter arranged to count packets passing by a location along a path to the packet receiving location and a controller configured to controllably operate at least one of the sampling funnel and the hold-back gate of the gated transfer funnel to control delivery of completed packets to a container at the packet receiving location in accordance with a predetermined number of packets.

US/PCT 36. The apparatus of US/PCT 35, further comprising delivering completed packets to a container at the packet receiving location in accordance with a predetermined number of packets and thereafter controllably moving the container from the packet receiving location to a second location and tamping the delivered completed packets at the second container location.

US/PCT 37. The apparatus of US/PCT 36, further comprising a weight check operative upon the container at a third container location beyond the second location, and an arrangement to adjust the feeding of the flowable material responsively to output of the weight check so as to maintain consistency of the feeding.

US/PCT 38. The apparatus of US/PCT 23 further comprising a cooling system arranged to cool at least one of the first and second rotors.

US/PCT 39. The apparatus of US/PCT 38, wherein the cooling system comprises a coaxial channel provided in the at least one of the first and second rotors and an open ended conduit coaxially disposed within the channel, the open ended conduit in communication with a source of coolant such that an incoming flow of coolant and a reversed flow of coolant is established within the at least one of the first and second rotors.

US/PCT 40. A system comprising an array of packet producing lanes, each lane comprising the apparatus of US/PCT 37, the system further comprising a conveyor arrangement controllably operative to repetitively move sets of containers to a corresponding set of the packet receiving locations at the lanes whereupon the lanes deliver a counted stream of completed packets to each container of the container set simultaneously, and thereafter the conveyor controllably moves the set of containers from the set of the packet receiving locations to a corresponding set of the second container locations whereupon the delivered completed packets of the container set are simultaneously tamped.

US/PCT 41. The apparatus of US/PCT 24, wherein the feeder comprises a rotating drive roller in proximity of the feed tube such that the tubular web structure is drawn along the feed tube by rotation of the drive roller.

US/PCT 42. The apparatus of US/PCT 41, wherein the feeder comprises a pair of drive rollers operative at opposite sides of the feed tube.

US/PCT 43. The apparatus of US/PCT 24, wherein the folder is configured to superimpose longitudinal edge portions of the web to form a radially outwardly directed fin.

US/PCT 44. The apparatus of US/PCT 43 further comprising a fin sealer arranged to seal the radially outwardly directed fin by directing the fin through a nip between first and second fin sealing rollers while communicating heat to the fin through at least one of the fin sealing rollers.

US/PCT 45. The apparatus of US/PCT 44, wherein the fin sealer is arranged further to maintain a nominal face-to-face relation between an outer annulus of the first fin sealing roller and an outer annulus of the second fin sealing roller with a flexible connection between the outer annulus of the second fin sealing roller and a hub component of the second fin sealing roller, whereby consistent sealing of the fin is enhanced.

US/PCT 46. The apparatus of US/PCT 45, wherein the flexible connection comprises a floating roller and a flexible, drive pin connection between the floating roller and the hub component.

US/PCT 47. The apparatus of US/PCT 46, wherein the flexible connection includes a compression washer.

US/PCT 48. The apparatus of US/PCT 45, wherein the flexible connection comprises an annulus of elastic material operatively disposed between the hub component and the outer annulus of the second fin sealing roller.

US/PCT 49. The apparatus of US/PCT 45, wherein the flexible connection comprises a disc of spring steel operatively disposed between the hub component and the outer annulus of the second fin sealing roller.

US/PCT 50. The apparatus of US/PCT 24, wherein the material feeder comprises a screw feeder having a controlled, adjustable output as a function of rotation of the screw feeder for each feed cycle.

US/PCT 51. The apparatus of US/PCT 24, wherein the material feeder comprises an arrangement that pneumatically delivers volumetrically established charges of the flowable material.

US/PCT 52. The apparatus of US/PCT 23 further comprising a cooling system arranged to cool at least one of the first and second rotors.

US/PCT 53. The apparatus of US/PCT 52, wherein the cooling system comprises a coaxial channel provided in the at least one of the first and second rotors and an open ended conduit coaxially disposed within the channel, the open ended conduit in communication with a source of coolant such that an incoming flow of coolant and a reversed flow of coolant is established within the at least one of the first and second rotors.

US/PCT 54. The apparatus of US/PCT 24, wherein the flowable material comprises tobacco.

US/PCT 55. An automated method of forming a transverse, cut seam of a packet, comprising: thermally sealing and severing a transverse seam by rotating sealing jaws, a knife and an anvil into opposing relation at a single nip; collecting the completed packets with a packet catcher; and further rotating the anvil, the knife and the sealing jaws into a proximal relation to a lip of a packet collector, whereby, should a completed packet stick to any of the anvil, the knife and/or the sealing jaws, the stuck packet is removed from the anvil, the knife and/or the sealing jaw.

US/PCT 56. A fin-sealing component of a packet making machine, comprising: a first roller comprising: a hub; a rigid outer annulus arranged to rotatably bear against a first side of a fin of a tubular web structure; and a heater in thermal communication with the rigid outer annulus of the first roller to transfer heat to the fin sufficient to seal the web along the fin as the fin is contacted with the rigid outer annulus of the first roller; a second roller comprising: a rigid outer annulus arranged to rotatably bear against an opposite side of the fin in an opposing, nominally face-to-face relation with the rigid outer annulus of the first roller; and a support of the rigid outer annulus of the second roller comprising a hub and a flexible connection operative between the hub and the rigid outer annulus of the second roller, the flexible connection operative to maintain the face-to—face relation between the rigid outer annulus of the first roller and the rigid outer annulus of the second roller, whereby consistent sealing of the fin seal is enhanced.

US/PCT 57. The fin-sealing component of US/PCT 56, wherein the flexible connection maintains the face-to—face relation by counteracting a tendency of an off-axis displacement of the hub of the first and/or the second roller to cant the respective rigid outer annulus of the first and second rollers away from the nominal face-to—face relation.

US/PCT 58. The fin-sealing component of US/PCT 56, wherein the first roller further comprises a driven support mechanism to support and controllably drive rotation the hub and the rigid outer annulus of the first roller, the driven support including a pivotal arm arranged to pivot the rigid outer annulus of the first roller between an operating position and a retracted position.

US/PCT 59. The fin-sealing component of US/PCT 56, wherein the second roller further comprises a driven support mechanism to support and controllably drive rotation of the hub and the rigid outer annulus of the second roller.

US/PCT 60. The fin-sealing component of US/PCT 56, wherein the flexible connection comprises a floating roller and a flexible, drive pin connection between the floating roller and the hub.

US/PCT 61. The fin-sealing component of US/PCT 60, wherein the flexible connection further comprises a compression washer.

US/PCT 62. The fin-sealing component of US/PCT 56, wherein the flexible connection comprises a disc of spring steel operative between the hub and the rigid outer annulus of the second fin sealing roller.

US/PCT 63. The fin-sealing component of US/PCT 56, wherein the flexible connection comprises a body of elastic material operatively disposed between the hub and the outer annulus of the second fin sealing roller.

US/PCT 64. The fin-sealing component of US/PCT 56, further comprising: a folder configured to form from a continuous ribbon of web a tubular web structure having a radially outwardly directed fin comprising mutually superimposed longitudinal edge portions of the web; and a feeder arranged to draw a continuous ribbon of web through the folder and along a path beyond the folder to a location of the first and second rollers.

US/PCT 65. A fin sealer arranged to seal a radially outwardly directed fin of a tubular web structure by directing the fin through a nip between a first and a second fin sealing rollers while communicating heat to the fin through at least one of the fin sealing rollers, the fin sealer being further arranged to maintain a nominal face-to-face relation between an outer annulus of the first fin sealing roller and an outer annulus of the second fin sealing roller with a flexible connection between a hub element of at least one of the first and second fin sealing rollers with the outer annulus of the respective first and second fin sealing rollers, whereby consistent sealing of the fin is enhanced.

US/PCT 66. The fin sealer of US/PCT 65, wherein heat is communicated to the fin through the first fin sealing roller.

US/PCT 67. The fin sealer of US/PCT 66, wherein the second fin sealing roller includes the flexible connection between the hub element and the outer annulus of the second fin sealing roller.

US/PCT 68. The fin sealer of US/PCT 67, wherein the first fin sealing roller includes the flexible connection between the hub element and the outer annulus of the first fin sealing roller.

US/PCT 69. A method of sealing superimposed edges of a finned web body with first and second sealing rollers, the method comprising maintaining a nominal face-to-face relation between an outer annulus of the first sealing roller and an outer annulus of the second sealing roller by flexibly connecting a hub of the second sealing roller with the outer annulus of the second sealing roller, whereby consistent sealing of the superimposed edges is enhanced.

US/PCT 70. The method of US/PCT 69 further comprising flexibly connecting a hub of the first sealing roller with the outer annulus of the first sealing roller.

US/PCT 71. A method of sealing a web body comprising: supporting a first thermally conductive sealing jaw on a first rotor; supporting a second thermally conductive sealing jaw on a second rotor; and rotating the first and second rotors to bring first and second sealing jaws into an opposing relation in contact with the web body; the rotating of the first and second rotors including heating at least the first sealing jaw of the first rotor and cooling the second rotor, whereby a transfer of heat from the first sealing jaw to the second sealing jaw is promoted.

Further illustrative, non-exclusive examples of structures and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:
1. A method of sealing a web body comprising:
supporting a first thermally conductive sealing jaw on a first rotor, supporting a second thermally conductive sealing jaw on a second rotor;
rotating the first and second rotors to bring the first second sealing jaws into an opposing relation in contact with the web body; and
while rotating the first and second rotors heating at least the first sealing jaw of the first rotor and cooling the second rotor, whereby transfer of heat from the first sealing jaw to the second sealing jaw is promoted.
2. The method of claim 1, wherein the cooling includes flowing coolant through a coaxial channel in the second rotor.

* * * * *